(12) United States Patent
Sun et al.

(10) Patent No.: US 10,775,524 B2
(45) Date of Patent: Sep. 15, 2020

(54) SIMULTANEOUS WAVEFIELD RECONSTRUCTION AND RECEIVER DEGHOSTING OF SEISMIC STREAMER DATA USING AN L1 INVERSION

(71) Applicant: Saudi Arabian Oil Company, Dhahran (SA)

(72) Inventors: Yimin Sun, The Hague (NL); Dirk Jacob Verschuur, Delft (NL)

(73) Assignee: Saudi Arabian Oil Company, Dhahran (SA)

(*) Notice: Subject to any disclaimer, the term of this patent is extended or adjusted under 35 U.S.C. 154(b) by 486 days.

(21) Appl. No.: 15/468,807

(22) Filed: Mar. 24, 2017

(65) Prior Publication Data

US 2017/0276818 A1 Sep. 28, 2017
US 2020/0257013 A2 Aug. 13, 2020

Related U.S. Application Data

(60) Provisional application No. 62/312,934, filed on Mar. 24, 2016.

(51) Int. Cl.
*G01V 1/36* (2006.01)
*G01V 1/38* (2006.01)

(52) U.S. Cl.
CPC ............. *G01V 1/368* (2013.01); *G01V 1/36* (2013.01); *G01V 1/38* (2013.01); *G01V 2210/46* (2013.01); *G01V 2210/56* (2013.01)

(58) Field of Classification Search
CPC ...... G01V 1/368; G01V 1/38; G01V 2210/46; G01V 2210/56
See application file for complete search history.

(56) References Cited

U.S. PATENT DOCUMENTS

| | | | |
|---|---|---|---|
| 8,699,297 B2 | 4/2014 | Ozdemir et al. |
| 9,081,111 B2 | 7/2015 | Amundsen et al. |
| 2013/0163379 A1 | 6/2013 | Poole |
| 2014/0016436 A1 | 1/2014 | Sollner et al. |
| 2014/0022860 A1 | 1/2014 | van Borselen et al. |
| 2014/0200812 A1 | 7/2014 | Kitchenside |
| 2014/0301158 A1 | 10/2014 | Zhang et al. |
| 2014/0365135 A1 | 12/2014 | Poole |

(Continued)

FOREIGN PATENT DOCUMENTS

| | | |
|---|---|---|
| CN | 101581223 | 11/2009 |
| WO | WO2010044918 A2 | 4/2010 |

(Continued)

OTHER PUBLICATIONS

Gordon Poole, Pre-Migration Receiver De-Ghosting and Re-Datuming for Variable Depth Streamer Data, 2013 SEG Annual Meeting, Houston, pp. 4216-4220 (Year: 2013).*

(Continued)

*Primary Examiner* — Toan M Le
(74) *Attorney, Agent, or Firm* — Fish & Richardson P.C.

(57) ABSTRACT

Raw 3D seismic streamer wavefield data is received as a receiver-ghosted shot gather. The received receiver-ghosted shot gather shot gather is processed into a normalized form as normalized data. The normalized data is partitioned into a plurality of user-defined sub-gathers and processed to generate a complete receiver-deghosted shot gather. Output of the complete receiver-deghosted shot gather is initiated.

9 Claims, 26 Drawing Sheets

(56) References Cited

U.S. PATENT DOCUMENTS

| | | |
|---|---|---|
| 2015/0212222 A1 | 6/2015 | Poole |
| 2015/0301209 A1 | 10/2015 | Yarman et al. |
| 2017/0097432 A1 | 4/2017 | Poole |
| 2018/0003842 A1 | 1/2018 | Coates et al. |

FOREIGN PATENT DOCUMENTS

| | | |
|---|---|---|
| WO | 2014179282 | 11/2014 |
| WO | 2016038458 | 3/2016 |

OTHER PUBLICATIONS

Gulf Cooperation Council Examination Report issued in GCC Application No. GC 2017-33108 on Jan. 14, 2019, 4 pages.

Sun and Verschuur, "Three-dimensional receiver deghosting of seismic streamer data using L1 inversion and redundant extended radon dictionary," Geophysical Prospecting, 2018, 17 pages.

Hennenfent, "Sampling and Reconstruction of Seismic Wavefields in the Curvelet Domain"; University of British Columbia; Apr. 1, 2008; 153 pages.

International Search Report and Written Opinion of the International Searching Authority issued in International Application No. PCT/US2017/023787 dated Jun. 27, 2017; 13 pages.

Trad, "Latest Views of the Sparse Radon Transform," Geophysics, vol. 68, No. 1, Jan.-Feb. 2003, pp. 386-399.

International Search Report and Written Opinion in International Application No. PCT/US2019/049719 dated Nov. 20, 2019, 16 pages.

Vrolijk et al., "Shot-based deghosting for variable sea surface and receiver depth," SEG Technical Program Expanded Abstracts 2017, Aug. 17, 2017, 6 pages.

Vrolijk et al., "Integrated receiver deghosting and closed-loop surface-multiple elimination," Geophysics, vol. 82, No. 4, Apr. 12, 2017, 9 pages.

Gulf Cooperation Council Examination Report issued in GCC Application No. GC 2017-33108 dated Dec. 29, 2019, 3 pages.

Chinese Office Action in Chinese Appln. No. 201780031733.3, dated Mar. 27, 2020, 15 pages, English translation.

GCC Examination Report in GCC Appln. No. GC 2017-33108, dated May 10, 2020, 3 pages.

\* cited by examiner

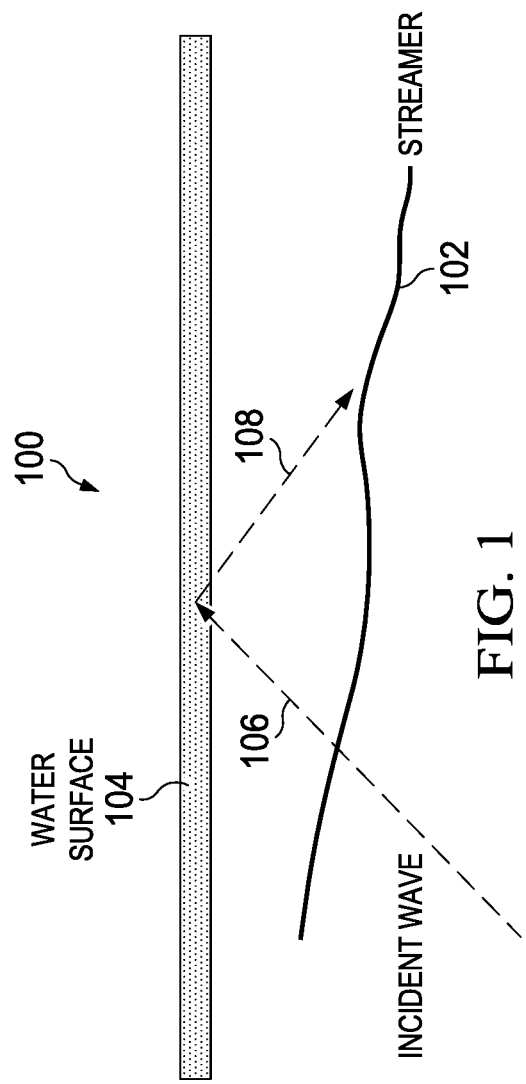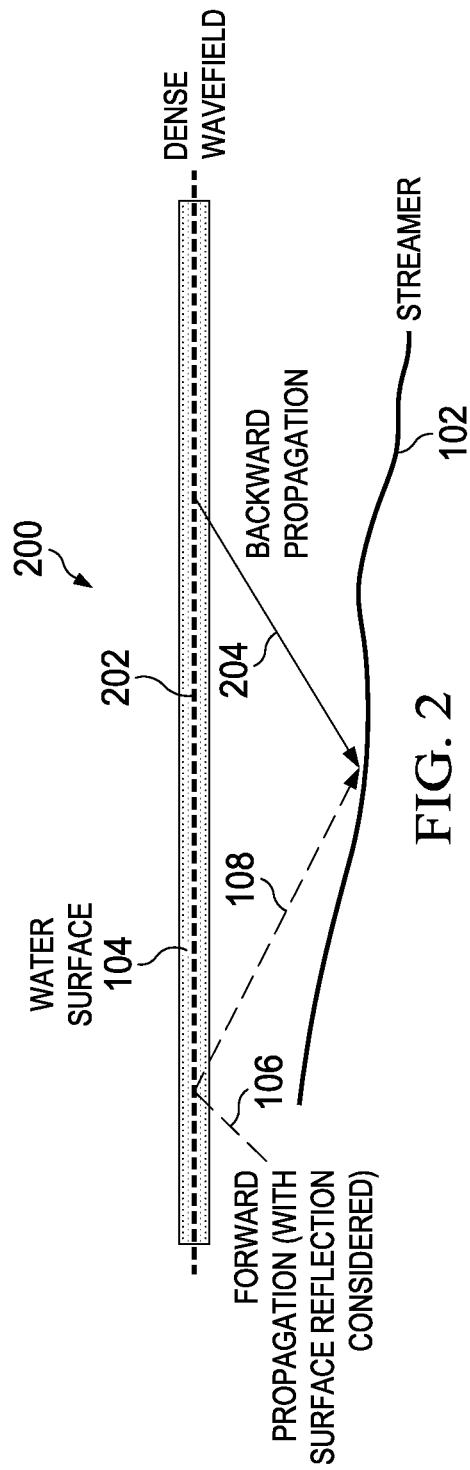

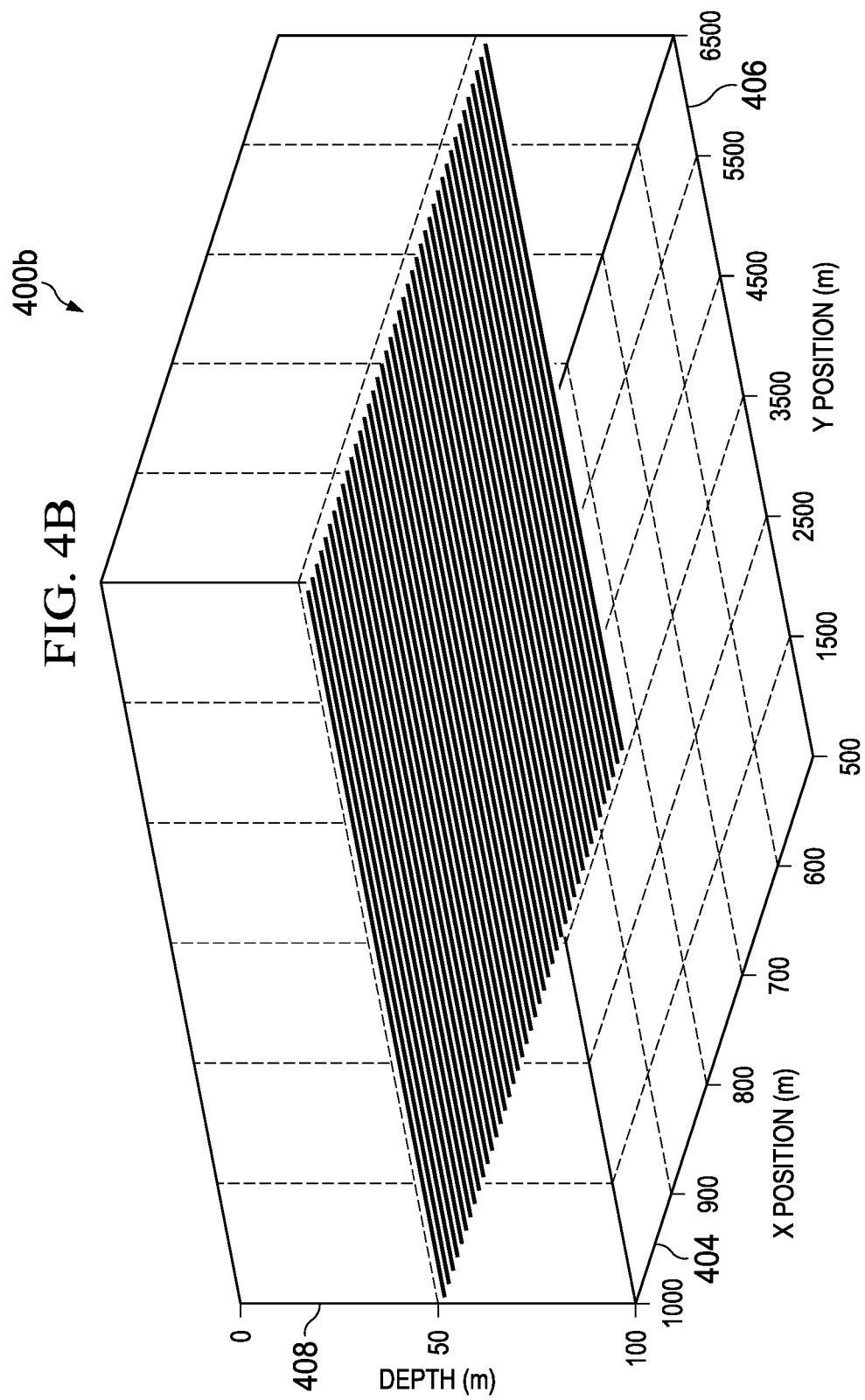

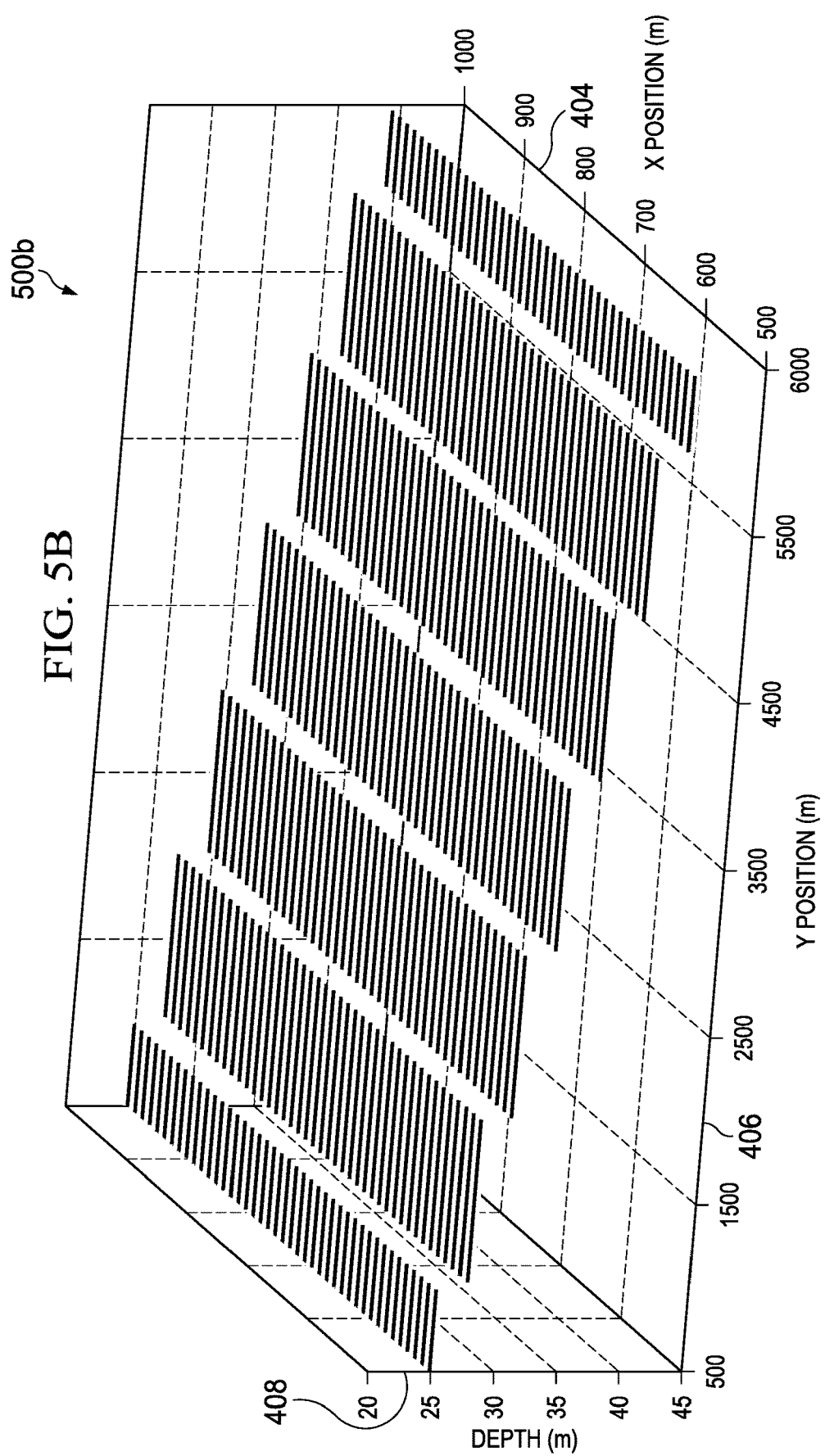

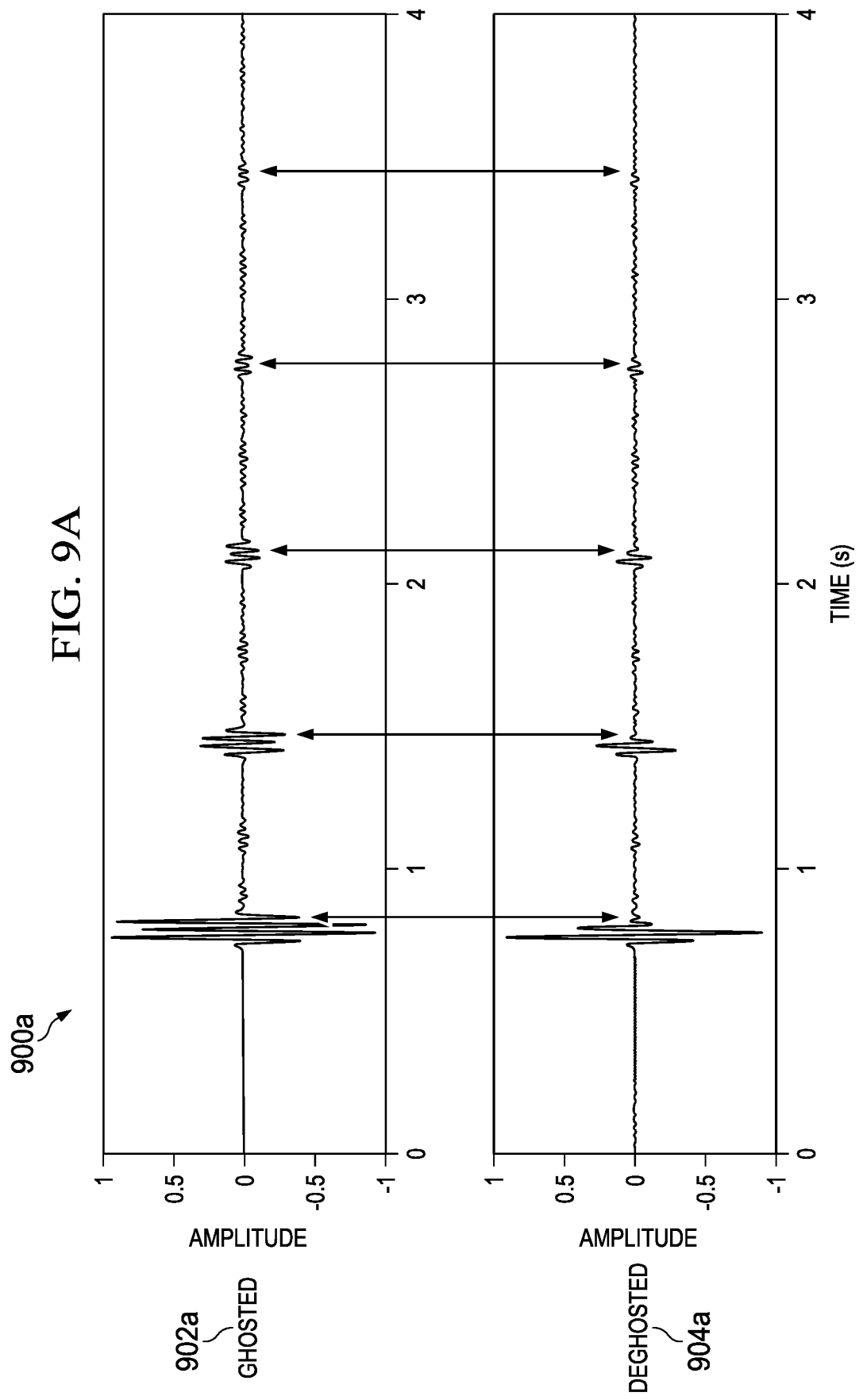

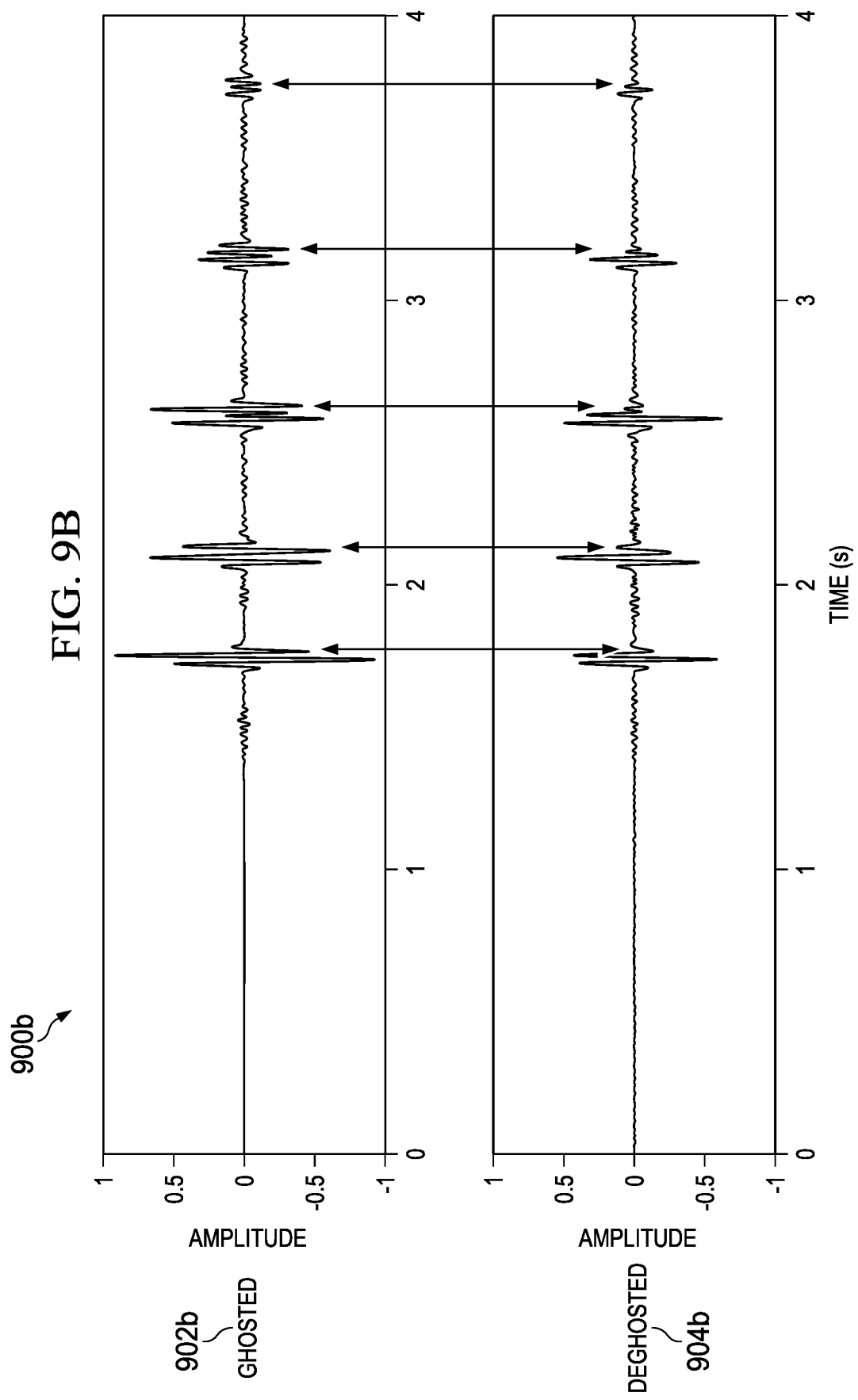

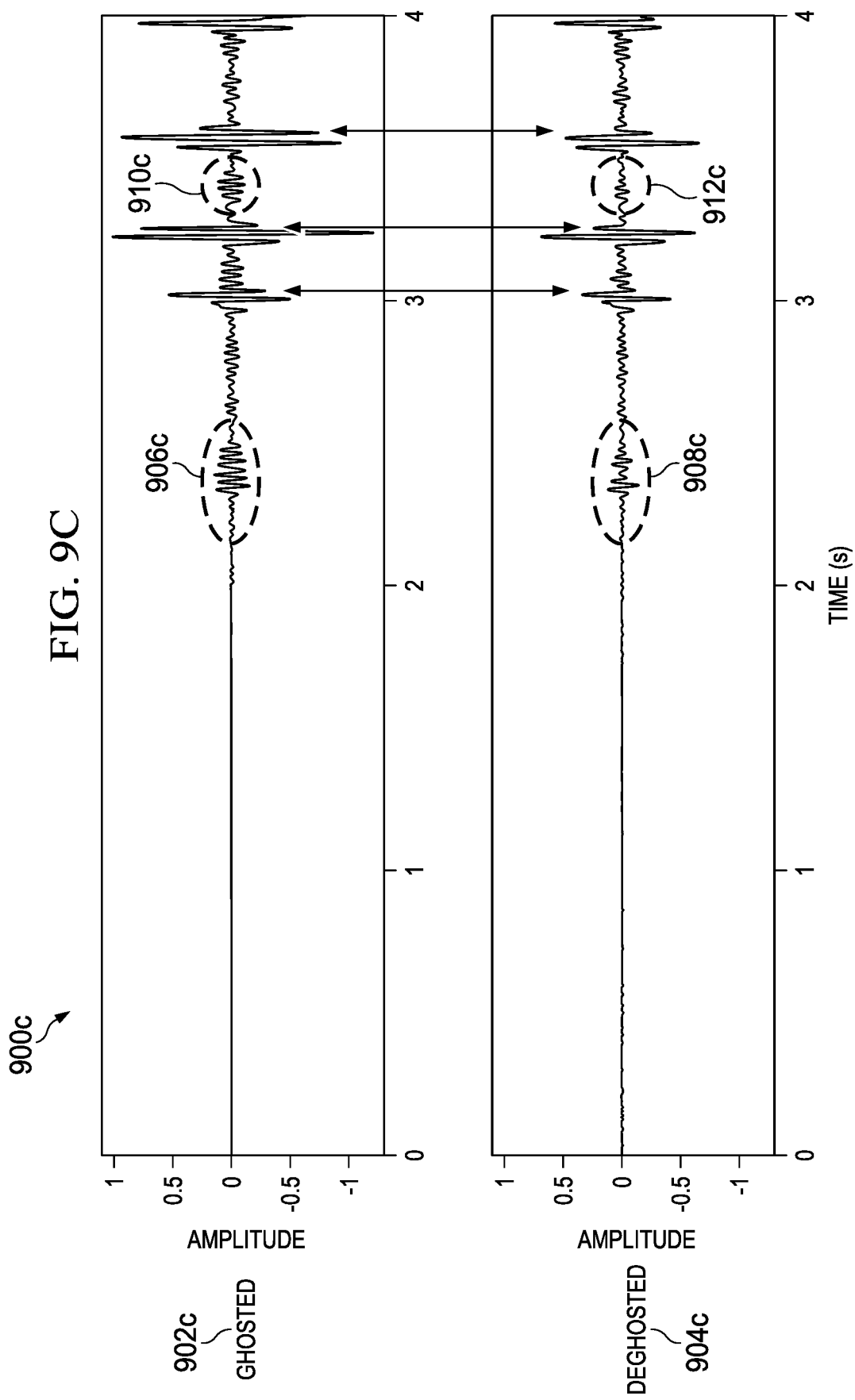

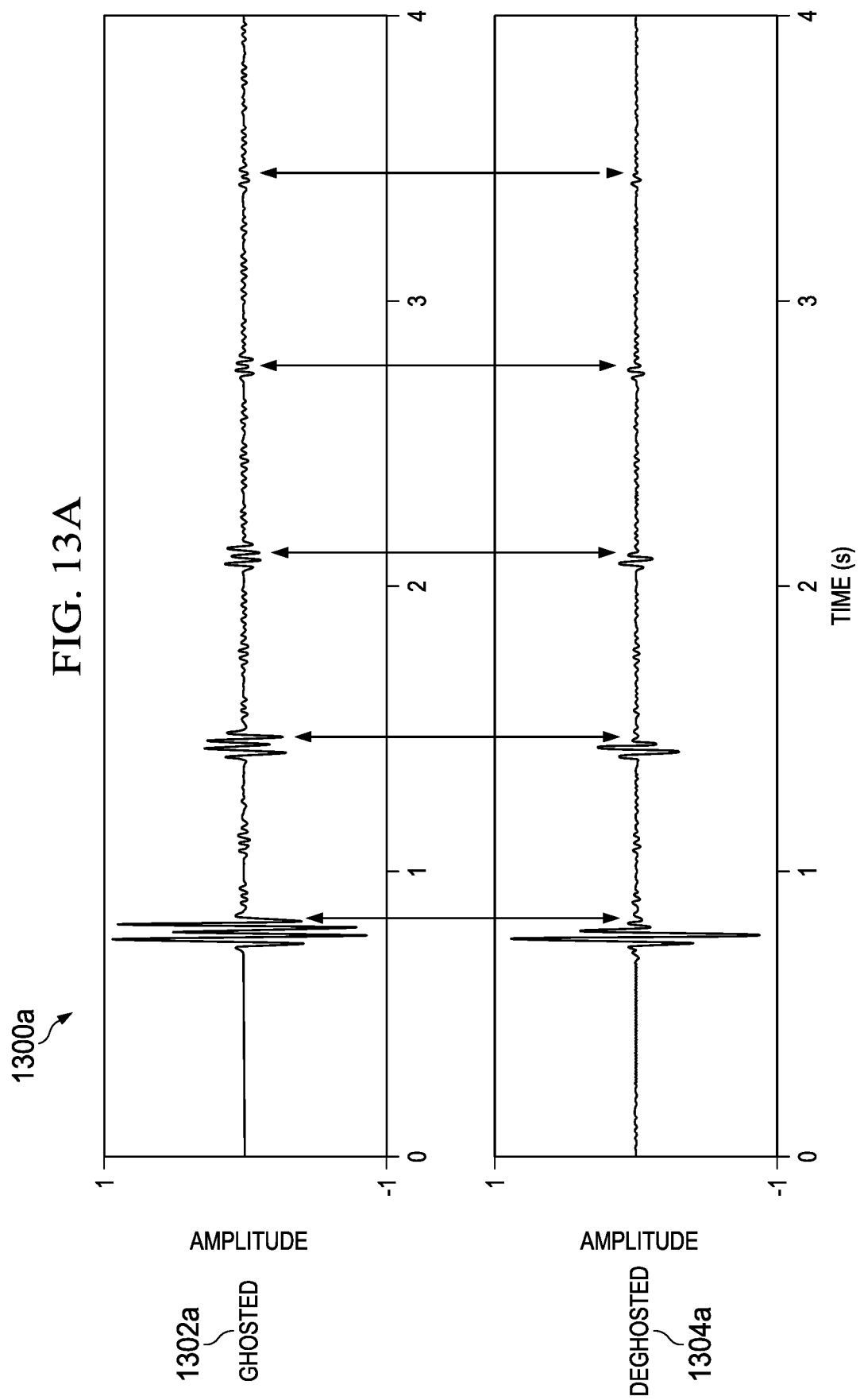

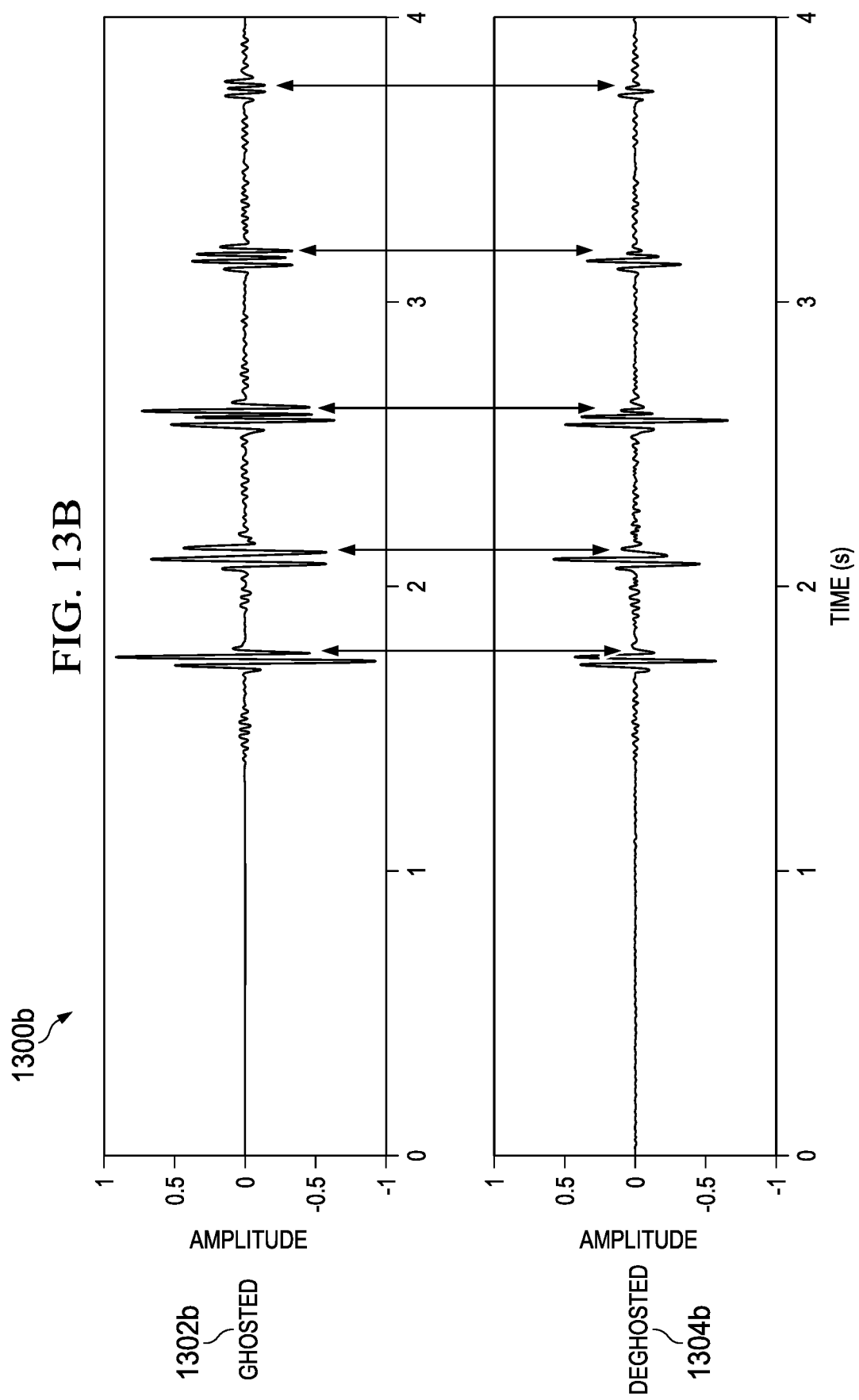

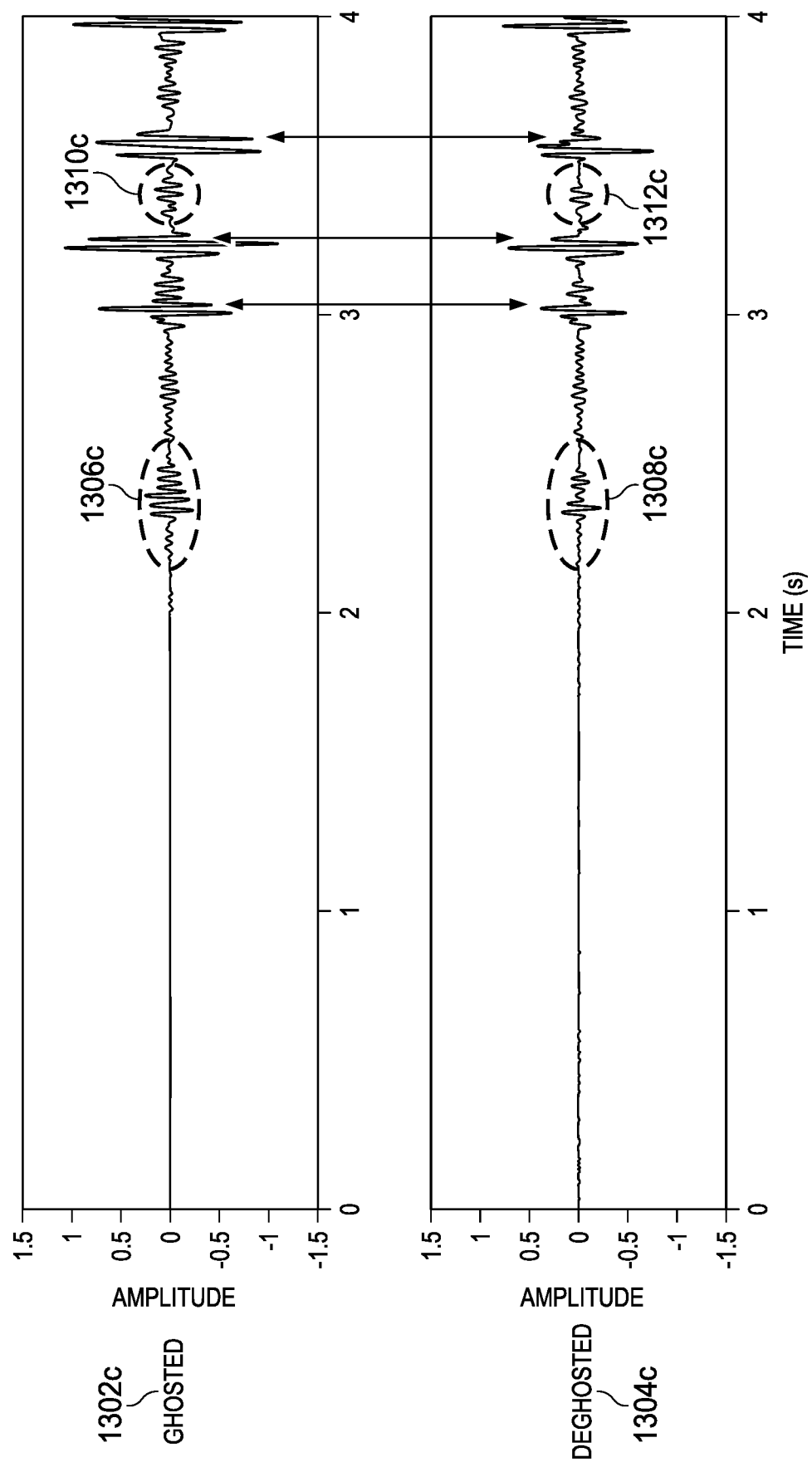

SIMULTANEOUS WAVEFIELD RECONSTRUCTION AND RECEIVER DEGHOSTING OF SEISMIC STREAMER DATA USING AN L1 INVERSION

CROSS REFERENCE TO RELATED APPLICATION(S)

This application claims the benefit of priority to U.S. Provisional Application Ser. No. 62/312,934, filed on Mar. 24, 2016, the contents of which are hereby incorporated by reference.

BACKGROUND

Receiver deghosting for seismic streamer data is a data processing challenge in geophysical prospecting. As the air-water interface is a strong reflector for pressure waves, upgoing seismic waves are reflected downward at the air-water interface and then further propagate back into the water where they interfere with an existing seismic wavefield at the seismic streamer locations. This effect is referred to as the "Receiver Ghost" effect in marine streamer data acquisition, causes distortions of both phase and amplitude, and normally a representative notch can be observed in the frequency spectrum of the recorded signals.

SUMMARY

The present disclosure describes simultaneous wavefield reconstruction and receiver deghosting of three-dimensional (3D) seismic streamer data using an L1 inversion.

In an implementation, raw 3D seismic streamer wavefield data is received as a receiver-ghosted shot gather. The received receiver-ghosted shot gather shot gather is processed into a normalized form as normalized data. The normalized data is partitioned into a plurality of user-defined sub-gathers and processed to generate a complete receiver-deghosted shot gather. Output of the complete receiver-deghosted shot gather is initiated.

The previously described implementation is implementable using a computer-implemented method; a non-transitory, computer-readable medium storing computer-readable instructions to perform the computer-implemented method; and a computer-implemented system comprising a computer memory interoperably coupled with a hardware processor configured to perform the computer-implemented method/the instructions stored on the non-transitory, computer-readable medium.

The subject matter described in this specification can be implemented in particular implementations so as to realize one or more of the following advantages. First, the described receiver deghosting method has no limitations on seismic streamer data acquisition schemes (for example, horizontal, slanted or curved), and can be applied on any type of measurements (for example, pressure or components of particle velocity). Second, a new redundant, hybrid, apex-shifted Radon dictionary (RHARD) is used as a basis dictionary for reconstructing a dense up-going wavefield at the surface of the water. The RHARD makes it possible to ideally build a complex wavefield (that is, with a mix of linear and curved events) with a few basic functions; making the use of sparsity inversion a suitable scheme in the described receiver deghosting method. Third, the use of the RHARD permits intelligent selection of equation terms to tradeoff between deghosting functionality and consumption of computing resources. Fourth, the described receiver deghosting method provides robust to realistic sparse data acquisition, and final output is a completely reconstructed and deghosted wavefield which can be located at arbitrary positions. Other advantages will be apparent to those of ordinary skill in the art.

The details of one or more implementations of the subject matter of this specification are set forth in the accompanying drawings and the description. Other features, aspects, and advantages of the subject matter will become apparent from the description, the drawings, and the claims.

DESCRIPTION OF DRAWINGS

FIG. 1 is a diagram illustrating seismic streamer data acquisition, according to an implementation.

FIG. 2 is a diagram illustrating a proposed solution to the reflection illustrated in FIG. 1, according to an implementation.

FIG. 4B is a plot illustrating a denser grid which the deghosted wavefield is output onto in the horizontal streamer configuration of FIG. 4A, according to an implementation.

FIG. 5B is a plot illustrating a deghosted wavefield output to a denser grid for the quasi-slanted streamer configuration of FIG. 5A, according to an implementation.

FIGS. 9A-9C and 13A-13C are plots illustrating trace comparisons, both before and after execution, of the described receiver deghosting method, according to an implementation.

Like reference numbers and designations in the various drawings indicate like elements.

DETAILED DESCRIPTION

Figure 3:
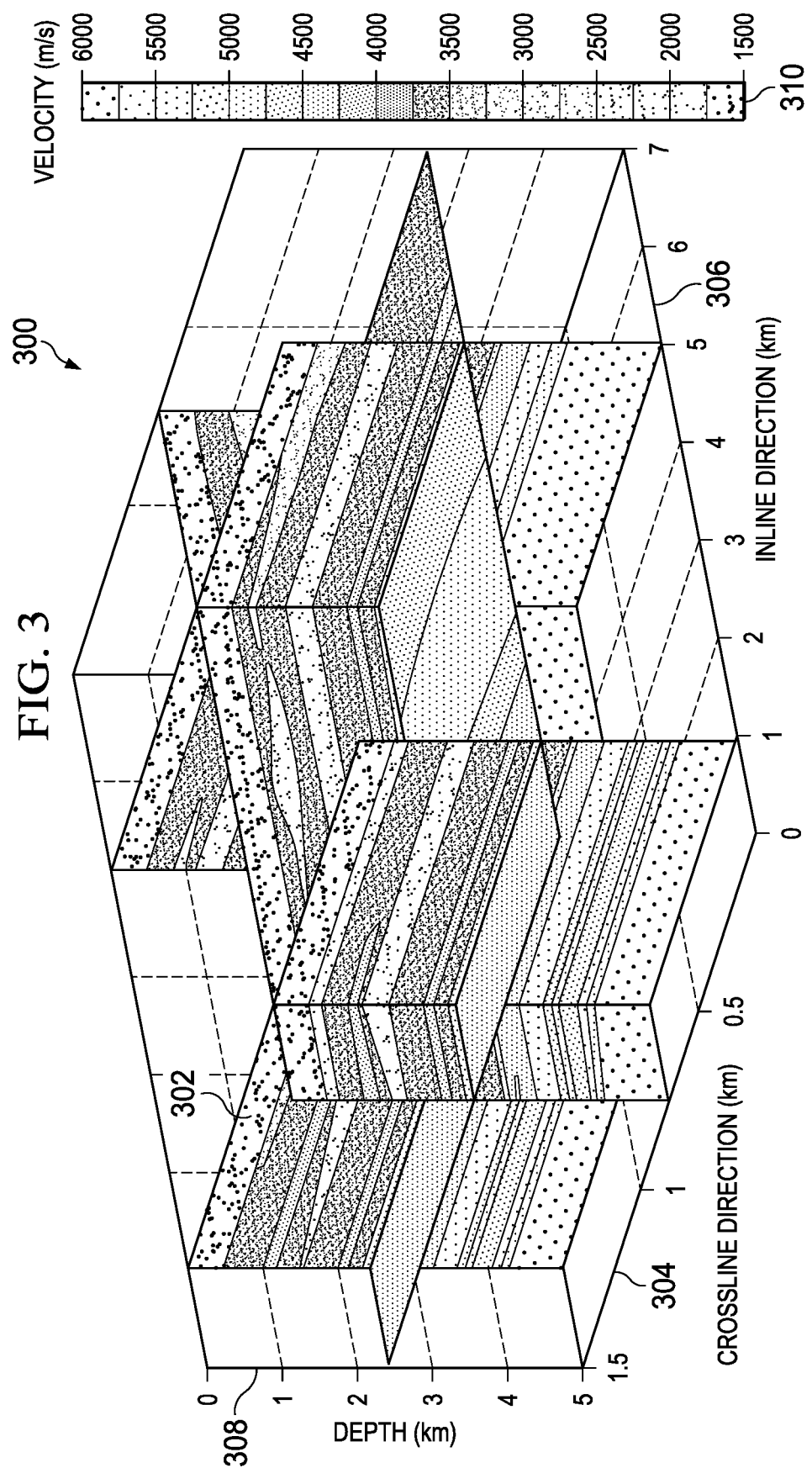
FIG. 3 is an illustration of a tailored three-dimensional (3D) EAGE/SEG overthrust model, according to an implementation.

The following detailed description describes simultaneous wavefield reconstruction and receiver deghosting of seismic streamer data using an L1 inversion and is presented to enable any person skilled in the art to make and use the disclosed subject matter in the context of one or more particular implementations. Various modifications to the disclosed implementations will be readily apparent to those skilled in the art, and the defined general principles may be applied to other implementations and applications without departing from the scope of the disclosure. The present disclosure is not intended to be limited to the described or illustrated implementations, but to be accorded the widest scope consistent with the described principles and features.

Receiver deghosting for seismic streamer data is a data processing challenge in geophysical prospecting. As the air-water interface is a strong reflector for pressure waves, upgoing seismic waves are reflected downward at the air-water interface and then further propagate back into the water where they interfere with an existing seismic wavefield at the seismic streamer locations. This effect is referred to as the "Receiver Ghost" effect in marine streamer data acquisition, causes distortions of both phase and amplitude, and normally a representative notch can be observed in the frequency spectrum of the recorded signals. Receiver deghosting aims at removal of the receiver ghost reflection from the marine seismic streamer data. With the advancement of marine broadband data acquisition and processing, it is becoming more crucial to apply proper three-dimensional (3D) receiver deghosting technologies to better preserve both bandwidth and resolution in the final receiver ghost-free signals.

To date, various receiver deghosting methods have been proposed, including or variants of: 1) use of Green's theorem as a general theoretical framework in deghosting; 2) use of a filter in the F-K domain; 3) use of a twin seismic streamer configuration; 4) use of both a hydrophone and geophone as a robust deghosting tool for ocean bottom cable (OBC) data (generally referred to as PZ-summation, which exploits the unique physical characteristics of the air-water interface reflected pressure and particle velocity signals); 5) consideration of multi-component seismic streamer data as an input for deghosting; 6) τ–p inversion; 7) use of an approximated pressure gradient to remove ghost signals; 8) application of a deconvolution method to suppress ghost signals; 9) deghosting based on building mirror data first using ray tracing; 10) consideration of similarity between deghosting and de-blending to handle deghosting as de-blending; 11) deghosting with over/under source acquisition; 12) developing an optimal stacking procedure that can help minimize ghost effects in a final image; 13) use of joint interpolation-deghosting to achieve genuine 3D deghosting; and 14) a method to exploit the causality property of the ghost effect by honoring, as much as possible, wave propagation.

Regardless of the listed and other receiver ghosting methods, a robust and physical 3D receiver deghosting utility is still lacking. Almost all of the proposed methods require dense wavefield sampling, but in real data acquisition a crossline interval is normally much larger than an inline interval (for example, typically, the ratio of the inline interval to the crossline interval varies between 1:4 and 1:8), which violates this fundamental assumption. As a trade-off solution, some methods are configured to work only on densely sampled two-dimensional (2D) inline data or even to make a bold one-dimensional (1D) propagation assumption. Other proposed methods involve interpolation explicitly as an independent operation. However, for real data situations, interpolation by itself is not a trivial problem, making optimal application of both steps difficult without propagation of errors. As a result, for 3D real data, the receiver deghosting challenge includes: 1) receiver ghost signal removal and 2) data sparsity.

Described is a receiver deghosting method capable of simultaneously deghosting receiver ghost signals and reconstructing a deghosted wavefield for seismic streamer data. The described method rigorously honors wave propagation phenomena during the receiver ghost process in a real 3D sense, and a new redundant, hybrid, apex-shifted Radon dictionary (RHARD) is used as a basis dictionary for reconstructing a dense up-going wavefield at the surface of water. The described receiver deghosting method frames the receiver deghosting problem as a Lasso problem, with a goal to minimize a mismatch between actual measurements and a simulated wavefield with an L1 constraint in the extended Radon space exploited in order to handle an under-determination challenge in an inversion. The receiver deghosting algorithm can be demonstrated, for example, on a realistic tailored 3D EAGE/SEG Overthrust model.

Theory and Method

In marine data acquisition, watercraft towed seismic streamers, which can be in any form (for example, horizontal, slanted, or curved), are normally situated from a few meters to several tens of meters below the surface of the water. As a result, an incident wavefield will pass the seismic streamers twice—once upward and once downward after being reflected by the surface of the water. Certain wavefield frequency components are suppressed or even cancelled due to the interference of the upgoing and downgoing seismic wavefields.

FIG. 1 is a diagram 100 illustrating seismic streamer data acquisition, according to an implementation. As illustrated seismic streamer 102 is situated below the surface of the water 104. Seismic streamer 104 can be in any form (for example, curved, horizontal, or slanted). Upgoing incident wavefield 106 passes seismic streamer 102 and reflects of the surface of the water 104 to generate downgoing incident wavefield 108.

FIG. 2 is a diagram 200 illustrating a proposed solution to the reflection illustrated in FIG. 1, according to an implementation. In the described implementation, the desired upgoing incident wavefield 106 is parameterized at the surface of the water 104 using dense sampling (dense wavefield) 202 and both forward propagated with water surface reflection considered (108) and backwardly propagated incident wavefield 204 to form measured data. Performing incident wavefield parameterization at the surface of the water 104 better meets the plane integral surface requirement in a Rayleigh integral, and realistic seismic streamer movements due to water currents in field data acquisition become a reduced challenge.

Data sparsity must also be considered in seismic streamer data processing. Normally, the inline direction of the seismic streamer is a dense data acquisition direction, while the crossline direction has a much larger interval (for example, the ratio of inline interval to crossline interval is typically between 1:4 and 1:8—a ratio of 1:4 is used in FIGS. 4A and 5A). As a result, a final acquired seismic wavefield data is usually aliased in the crossline direction, which complicates receiver deghosting.

In order to optimally handle both the receiver deghosting problem and data sparsity, both challenges should be simultaneously addressed while rigorously honoring actual physics principles. Therefore, the aim is finding a densely sampled upgoing wavefield that, after including the correct physics of a free water surface, matches measured data at receiver locations. The previously described receiver ghosting process happens in water, which here is treated as an isotropic and homogeneous medium. Therefore, acoustic wave propagation theory is already sufficient, and the Rayleigh integral is chosen to physically describe the receiver ghosting effect.

In order for the Rayleigh integral to function correctly, two conditions must be fulfilled: 1) the integral surface must be a plane and 2) wavefield sampling on the plane must be dense. The dense wavefield sampling requirement is automatically met in the described method, as a dense wavefield being targeted as the final solution, but the integral plane condition must be handled with care in order for the method to be versatile and robust for any possible streamer shapes, even including feathering effects in real data acquisition scenarios.

The surface of the water 104, which, in reality, is roughly planar, is used as an integral plane, and the dense upgoing incident wavefield 106 at the surface of the water is treated as a final solution target. The receiver ghost process can be described as a summation of the backwardly propagated incident wavefield 204 (from the water surface to the receiver locations) and the water surface reflected and forwardly propagated (downgoing) incident wavefield 108 (also from the surface of the water 104 to seismic receiver locations—not illustrated).

Mathematically, the receiver ghosting process can be described as:

$$b = SP^- y + SP^+ Ry = S(P^- + P^+ R)y, \quad (1)$$

where:

b is a vector containing measured data, y is a dense wavefield vector at the surface of the water, S is a sub-sampling matrix corresponding to a real, sparse data acquisition scheme in both the inline and the crossline directions, $P^-$ and $P^+$ are one-way wavefield propagation matrices (backward and forward, respectively) from the surface of the water to pre-defined dense target locations, and R is a water surface reflectivity matrix.

The dense wavefield 202 at the surface of the water 104 can be considered a 3D seismic data cube $f(g_x, g_y, t)$, where $g_x$ and $g_y$ are x position and y position of the receiver at the surface, and t is time. This dense wavefield 202 is packed into the vector y of Equation (1).

With S (indicating that the measured data is sparse (that is, dim(b)<dim(y)) in Equation (1)), $S(P^-+P^+R)$ is generally not mathematically invertible. In order to overcome this mathematical problem, the receiver deghosting problem is framed as:

$$\min_x \|Ax - b\|_2 \text{ s.t. } \|x\|_1 < t, \quad (2)$$

where:

$$A = S \cdot (P^- + P^+ R)D. \quad (3)$$

Equation (2) is the Lasso problem in mathematics. In Equations (2) and (3), x is a vector containing an encoded dense wavefield at the surface of the water and D is a corresponding transformation matrix, which ensures that y=Dx. The key to the success of Equation (2) is to find a suitable dictionary so that the encoded wavefield x in this dictionary is indeed a sparse representation of the dense wavefield y at the surface of the water.

In the described method, this dense wavefield is encoded per crossline slice, and every crossline slice has its own particular representation. Together with the transformation matrix D, this encoding step can be expressed mathematically as:

$$y = \begin{bmatrix} y_{slice\ 1} \\ y_{slice\ 2} \\ \vdots \\ y_{slice\ n-1} \\ y_{slice\ n} \end{bmatrix} = Dx = \begin{bmatrix} D_{2d} & 0 & \cdots & 0 & 0 \\ 0 & D_{2d} & 0 & & 0 \\ \vdots & & \ddots & & \vdots \\ 0 & 0 & \cdots & D_{2d} & 0 \\ 0 & 0 & 0 & & D_{2d} \end{bmatrix} \begin{bmatrix} x_{slice\ 1} \\ x_{slice\ 2} \\ \vdots \\ x_{slice\ n-1} \\ x_{slice\ n} \end{bmatrix}, \quad (4)$$

where:

$x_{slice\ i}$ is a vector containing wavefield representations of the crossline slice i of the dense wavefield and $D_{2d}$ is the corresponding matrix that transforms the encoded wavefield $x_{slice\ i}$ to wavefield $y_{slice\ i}$. As previously discussed, in order for $x_{slice\ i}$ to be sparse, a redundant dictionary should be used. An explanation of building an appropriate redundant dictionary follows.

The method starts with the known Taylor Series for function $f$ of variable $\xi$:

$$f(\xi) = \sum_{n=0}^{\infty} \frac{f^{(n)}(\xi_0)}{n!} (\xi - \xi_0)^n, \quad (5)$$

where:

$f^{(n)}$ is the $n^{th}$ order derivative function and $\xi_0$ is a constant apex value. Equation (5) indicates that any smooth 2D curve can be described by representations $$\left( \frac{f^{(0)}(\xi_0)}{0!}, \frac{f^{(1)}(\xi_0)}{1!}, \frac{f^{(2)}(\xi_0)}{2!}, \ldots, \frac{f^{(n)}(\xi_0)}{n!}, \ldots \right)$$

with the corresponding dictionary $((\xi-\xi_0)^0, (\xi-\xi_0)^1, (\xi-\xi_0)^2, \ldots, (\xi-\xi_0)^n, \ldots)$ used. However, if Equation (5) is scrutinized, the dictionary is actually sparse—for every term containing $\xi^n$, there is only one building block available, $(\xi-\xi_0)^n$, meaning that for any curve with the apex far away from $\xi_0$, many terms will be required for an accurate approximation of $f(\xi)$.

Therefore, this kind of sparse dictionary cannot meet the fundamental requirement for sparse representation, so modifications to Equation (5) are necessary. As a result, manual introduction of more apex shifts are made into Equation (5). The modified equation becomes:

$$f(\xi) = \tau + p\xi + \Sigma_{n=2}^{\infty} \Sigma_{i_n = A_n}^{B_n} q_{i_n} (\xi - \xi_{i_n})^n, \quad (6)$$

where:

the $0^{th}$ order and $1^{st}$ order term are untouched compared to Equation (5), but for the $n^{th}$ order term (n>1), there are multiple building blocks available, $(\xi-\xi_{i_n})^n$, where $\xi_{i_n}$ is a manually introduced apex and $q_{i_n}$ is the corresponding representation. This extra redundancy is controllable in Equation (6) using control parameters $A_n$ and $B_n$. Equation (6) reflects thinking regarding redundancy building, implemented in the Radon domain as a dictionary and, as previously described, is referred to as a Redundant, Hybrid, Apex-Shifted Radon Dictionary (RHARD).

Using the RHARD, $D_{2d}$ in Equation (4) can be expressed as:

$$D_{2d} = F^{-1} \cdot O^{-1} \cdot [L_1 L_{2,1} L_{2,2} \ldots L_{2,n_2} L_{3,1} \ldots L_{3,n_3} \ldots L_{p,n_p}] \cdot O \cdot F, \quad (7)$$

where:

$$L_1 = \begin{bmatrix} L_{1,\omega_1} & 0 & \ldots & 0 & 0 \\ 0 & L_{1,\omega_2} & & 0 & 0 \\ \vdots & & \ddots & & \vdots \\ 0 & 0 & \ldots & L_{1,\omega_{N_{max}-1}} & 0 \\ 0 & 0 & 0 & & L_{1,\omega_{N_{max}}} \end{bmatrix}, \quad (8)$$

with:

$$L_{1,\omega_i} = \begin{bmatrix} e^{-i\omega_i x_1 P_1} & e^{-i\omega_i x_1 P_2} & \ldots & e^{-i\omega_i x_1 P_{M_1-1}} & e^{-i\omega_i x_1 P_{M_1}} \\ e^{-i\omega_i x_2 P_1} & e^{-i\omega_i x_2 P_2} & & e^{-i\omega_i x_2 P_{M_1-1}} & e^{-i\omega_i x_2 P_{M_1}} \\ \vdots & & \ddots & & \vdots \\ e^{-i\omega_i x_{N-1} P_1} & e^{-i\omega_i x_{N-1} P_2} & \ldots & e^{-i\omega_i x_{N-1} P_{M_1-1}} & e^{-i\omega_i x_{N-1} P_{M_1}} \\ e^{-i\omega_i x_N P_1} & e^{-i\omega_i x_N P_2} & & e^{-i\omega_i x_N P_{M_1-1}} & e^{-i\omega_i x_N P_{M_1}} \end{bmatrix}, 1 \le i \le N_{max}, \quad (9)$$

and where:

$$L_{s,n_s} = \begin{bmatrix} L_{s,n_s,\omega_1} & 0 & \ldots & 0 & 0 \\ 0 & L_{s,n_s,\omega_2} & & 0 & 0 \\ \vdots & & \ddots & & \vdots \\ 0 & 0 & \ldots & L_{s,n_s,\omega_{N_{max}-1}} & 0 \\ 0 & 0 & 0 & & L_{s,n_s,\omega_{N_{max}}} \end{bmatrix}, 2 \le s \le n_p, \quad (10)$$

with:

$$L_{s,n_s,\omega_i} = \begin{bmatrix} e^{-i\omega_i(x_1-a_{n_s})^s q_1} & e^{-i\omega_i(x_1-a_{n_s})^s q_2} & \ldots & e^{-i\omega_i(x_1-a_{n_s})^s q_{M_s-1}} & e^{-i\omega_i(x_1-a_{n_s})^s q_{M_s}} \\ e^{-i\omega_i(x_2-a_{n_s})^s q_1} & e^{-i\omega_i(x_2-a_{n_s})^s q_2} & & e^{-i\omega_i(x_2-a_{n_s})^s q_{M_s-1}} & e^{-i\omega_i(x_2-a_{n_s})^s q_{M_s}} \\ \vdots & & \ddots & & \vdots \\ e^{-i\omega_i(x_{N-1}-a_{n_s})^s q_1} & e^{-i\omega_i(x_{N-1}-a_{n_s})^s q_2} & \ldots & e^{-i\omega_i(x_{N-1}-a_{n_s})^s q_{M_s-1}} & e^{-i\omega_i(x_{N-1}-a_{n_s})^s q_{M_s}} \\ e^{-i\omega_i(x_N-a_{n_s})^s q_1} & e^{-i\omega_i(x_N-a_{n_s})^s q_2} & & e^{-i\omega_i(x_N-a_{n_s})^s q_{M_s-1}} & e^{-i\omega_i(x_N-a_{n_s})^s q_{M_s}} \end{bmatrix}, 1 \le i \le N_{max}, \quad (11)$$

where:

$\omega_i$ is the angular frequency.

In Equation (7), F is a Fourier transformation matrix; $F^{-1}$ is an inverse Fourier transformation matrix; $[L_1 \ L_{2,1} \ L_{2,2} \ldots L_{2,n_2} \ L_{3,1} \ldots L_{3,n_3} \ldots L_{p,n_p}]$ is a RHARD matrix which reflects the idea of Equation (6), where $L_1$ is the linear Radon transformation matrix as detailed in Equations (8) and (9), and $L_{p,n_p}$ is the $p^{th}$ order Radon transformation matrix with the curve apex at $a_{n_p}$, as detailed in Equations (10) and (11); O is a matrix that reorders the vector so that the RHARD matrix can be used; $O^{-1}$ is an inverse manipulation corresponding to O which reorders the vector back to the original order so that the $F^{-1}$ matrix can be used.

Equations (2)-(11) form the backbone of the described deghosting method, and once x is solved, then either in-situ deghosted wavefield, SP⁻Dx, or deghosted and reconstructed wavefield, P⁻Dx, can be calculated in a straightforward manner. Further, since the upgoing dense wavefield at the surface of the water, y=Dx, is available, the wavefield at any position in the water can be calculated provided that a corresponding propagation matrix is available.

Equation (2) is the Lasso problem in Mathematics, for which various solvers can be used. In one implementation, a spectral projected gradient (SPGL1) solver can be is used. In other implementations, other solvers (for example, public, proprietary, or commercial) can be used.

In order to achieve satisfactory results, it is crucial to build P⁻ and P⁺ in Equation (3) suitably. Theoretically speaking, in the Rayleigh theory, the integral aperture should be infinite, but in reality this requirement is not practical. As a result, P⁻ and P³⁺ must take this limited aperture effect into consideration, and different choices with respect to these two matrices bring slightly different results. Experimental evidence suggests optimally to use smooth, weighted, least-squares optimized, one-way wavefield propagation operators to build P⁻ and P³⁺. An advantage of using limited aperture is that the wavefield calculation can be decoupled: for a wavefield within a certain area, only limited integral area in the integral plane needs to be considered. Therefore, in the described calculations, the complete solution area is divided into overlapping smaller spatial-time windows which are separately processed. All the results of the separate processing are averaged and spliced together to form a final result. Two benefits can be obtained from this approach: 1) although the complete solution area may be large, a sub-area can be configured to be of a size to be handled with limited computational resources and 2) due to edge effects of the integral aperture, computational artifacts exist but can be largely suppressed using averaging since the sub-areas overlap.

R in Equation (3) should also be handled with care. Although in most reported methods R is always assumed to be –I, in reality its behavior is much more complex since the surface of the water cannot be perfectly planar. Fluctuations of the surface of the water mainly influence reflection behavior of high-frequency components. Tuning the value of R can provide better results in realistic field data situations, especially for high frequency signals. Note that R is set to –I in the following example.

FIG. 3 is an illustration of a tailored 3D EAGE/SEG overthrust model 300, according to an implementation. An example using a tailored 3D European Association of Geoscientists (EAGE)/Society of exploration Geophysicists (SEG) overthrust model is now described. To generate the tailored overthrust model, a 500 m thick water layer 302 is placed on top of a base EAGE/SEG overthrust model. A subset of this modified base model (crossline direction 304 (X direction) between 10 km and 11.5 km, inline direction 306 (Y direction) between 7.5 km and 14.5 km, and depth 308 (Z direction) between 0 and 5 km) is selected as the tailored SEG overthrust model 300. The velocity (m/s) 310 indicates the medium velocity of this tailored model. In this implementation, a 3D acoustic finite-difference time-domain (FDTD) simulation package is used as a forward modelling engine.

A corresponding density model is also built based upon this tailored velocity model, and density values are connected with the velocity values using the Gardner Equation relating P-wave velocity to bulk density (except for the water layer, where the density value is 1000 kg/m³):

$$\rho = \alpha V_p^\beta, \quad (12)$$

where:

$\rho$ is bulk density given in kg/m³, $V_p$ is P-wave velocity given in m/s, and $\alpha$ and $\beta$ are empirically derived constants that depend on geology.

Regarding the data acquisition schemes, two situations are considered: 1) a horizontal streamer situation and 2) a slanted streamer situation (as illustrated in FIG. 2). In both situations, the source wavelet is a Ricker wavelet with the dominant frequency set at 20 Hz, and the source position 402 is located at (crossline (X) position (m) 404 at 750 m, inline (Y) position (m) 406 at 750 m, and depth (m) 408 at 5 m). The maximum frequency for the inversion is set at 75 Hz, so the inversion is band limited. The streamer data acquisition covers an area of 500 m (X direction, between 500 m and 1000 m) by 6 km (Y direction, between 500 m and 6500 m). The inline (Y direction) interval is set at 12.5 m, and the crossline (X direction) interval is set at 50 m.

Figure 4A:
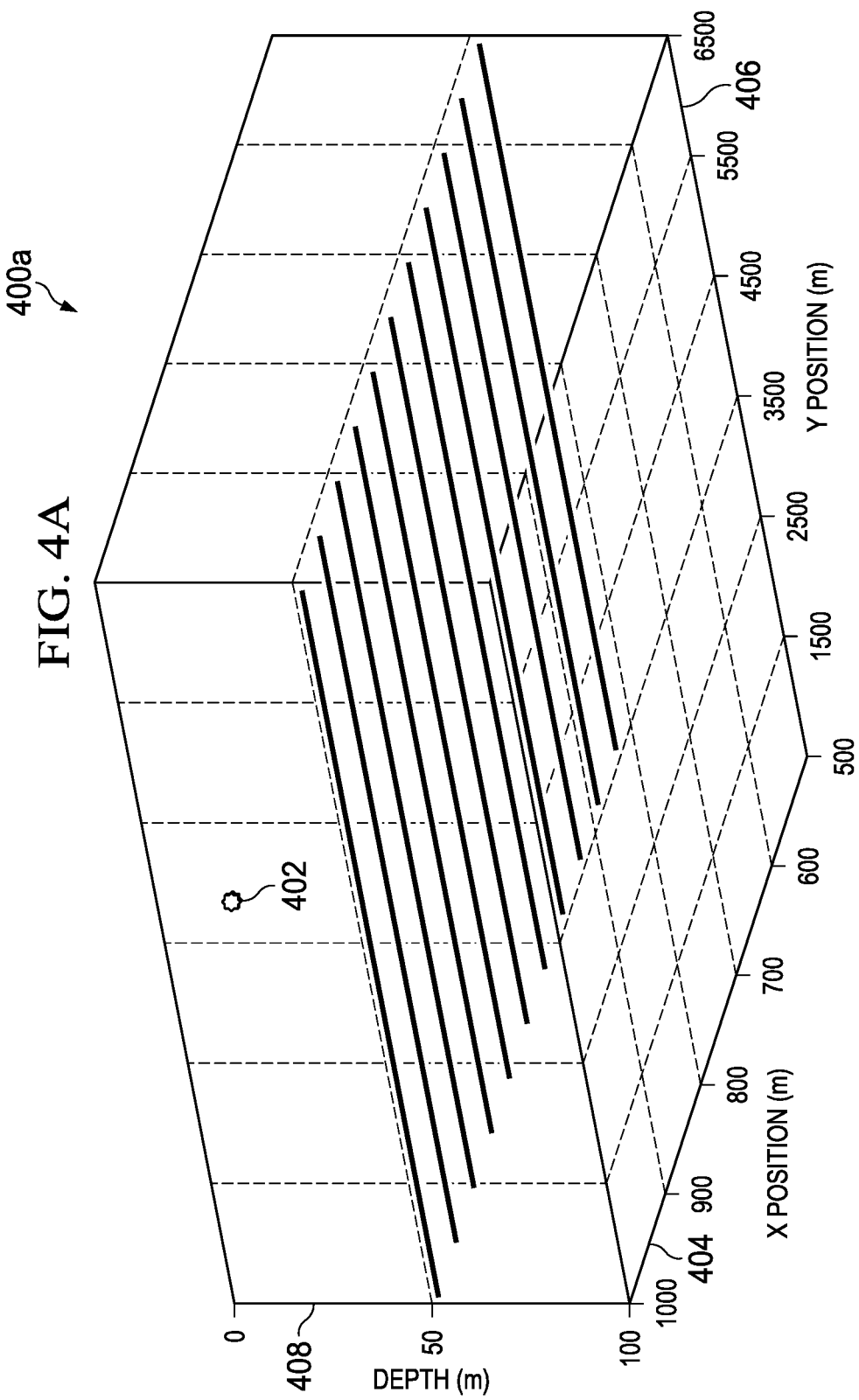
FIG. 4A is a plot illustrating a horizontal streamer configuration, according to an implementation.

FIG. 4A is a plot 400a illustrating a horizontal streamer configuration, according to an implementation. The red star designates the source position, (crossline (X) position (m) 402 at 750 m, inline (Y) position (m) 404 at 750 m, and depth (m) 406 at 5 m). Inline (Y direction) interval is 12.5 m, and crossline (X direction) interval is 50 m. Graphed points represent receiver locations and illustrate where a wavefield was sampled. For the horizontal streamer situation, the streamer depth is set at 30 m.

FIG. 4B is a plot 400b illustrating a denser grid which the deghosted wavefield is output onto in the horizontal streamer configuration of FIG. 4A, according to an implementation. After reconstruction of the deghosted wavefield, both inline interval and crossline interval are 12.5 m, and the receiver depth remains at 30 m. Graphed points represent receiver locations and illustrate where a wavefield was sampled.

Figure 5A:
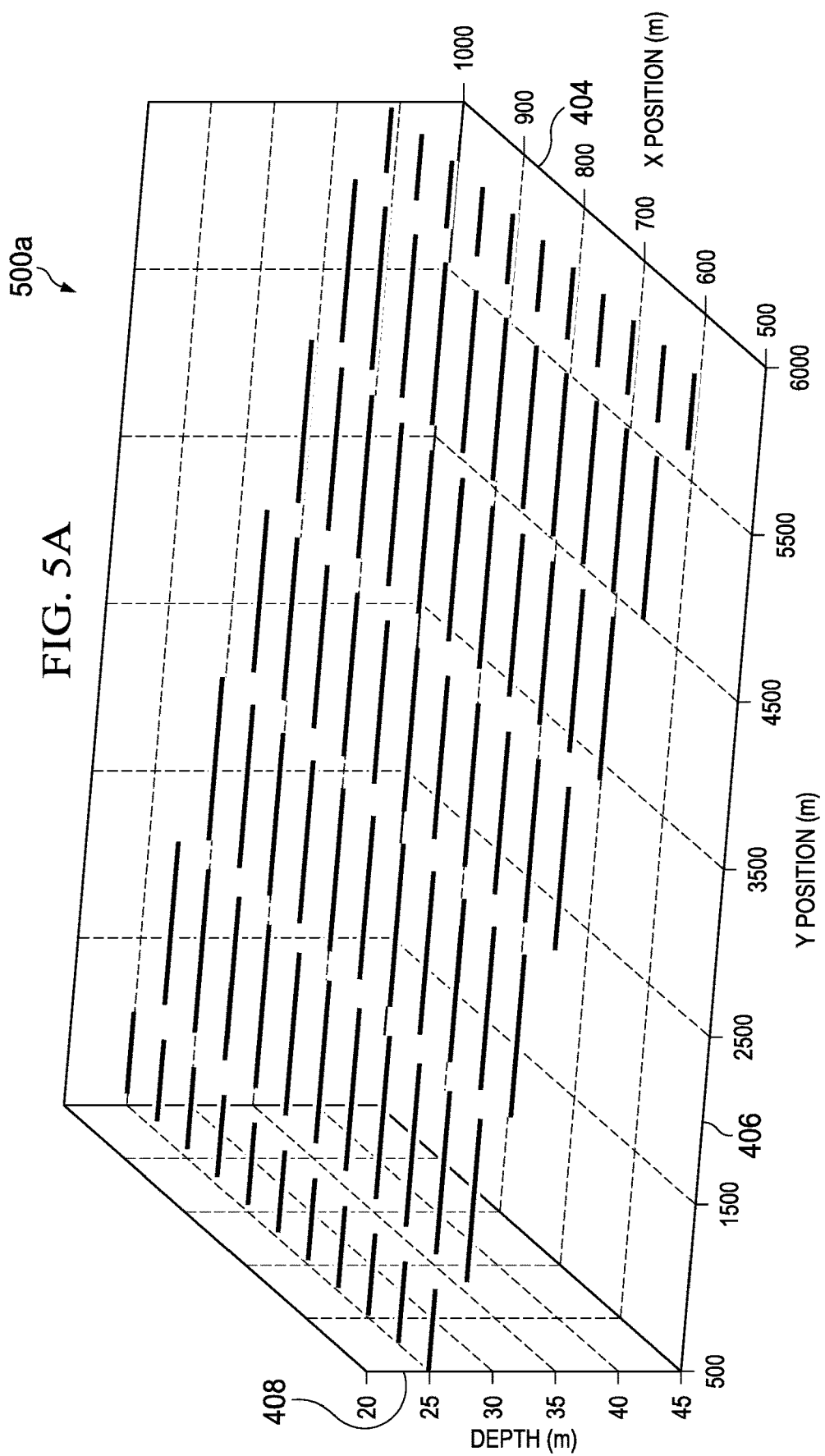
FIG. 5A is a plot illustrating a quasi-slanted streamer configuration, according to an implementation.

FIG. 5A is a plot 500a illustrating a quasi-slanted streamer configuration, according to an implementation. Graphed points represent receiver locations and illustrate where a wavefield was sampled. Inline (Y direction) interval is 12.5 m, and crossline (X direction) interval is 50 m. For the slanted streamer situation, due to the fact that FDTD is the simulation method, continuously varying depth is not possible, so as a trade-off solution a quasi-slanted data-acquisition scheme is used as shown in FIG. 5A. In this quasi-slanted data-acquisition scheme, the crossline direction receivers are all at the same depth, while in the inline direction the receiver depth within the initial 500 m is set at 25 m, and after every 1 km the receiver depth is further increased by 2.5 m, until the receiver depth reaches 40 m at the boundary of the data acquisition area. After reconstruction of the deghosted wavefield, both inline interval and crossline interval are 12.5 m, and the receiver depth geometry remains the same as before the reconstruction as shown in FIG. 5B. Before and after reconstruction, the receiver depth geometry follows the same design rules.

In order to suppress computation artifacts, in one particular implementation, thirty-four overlapped spatial windows are used to carry out the described deghosting procedure on data: in the time direction the whole window being taken; x∈[500 m, 1000 m], y∈[500+200*im, 500+200*i+500 m], 0≤i≤27, and y∈[500*im, 500*(i+1)m], i=1, 3, 5, 7, 9, 11. The final deghosted result is the arithmetic average of all the spatial windows. A square Rayleigh integral aperture with side length of 250 m is used.

In Equation (7), the linear Radon term plus three parabolic Radon terms are used, and, in an implementation, apex value selection can be as follows: for each spatial window, a sparse central crossline image is selected; the parabolic Radon contribution is calculated with the apex scanned through the whole crossline range, x∈[500 m, 1000 m], and an apex value is selected that leads to the smallest residual on this crossline image. After the apex value is singled out, the residual image is used as a new crossline image and the process repeated until all needed apex values have been selected. The apex value selection process reflects the known concept of Matching Pursuits.

FIG. 5B is a plot 500b illustrating a denser grid which the deghosted wavefield is output onto in the quasi-slanted streamer configuration of FIG. 5A, according to an implementation. Graphed points represent receiver locations and illustrate where a wavefield was sampled.

Figure 6A:
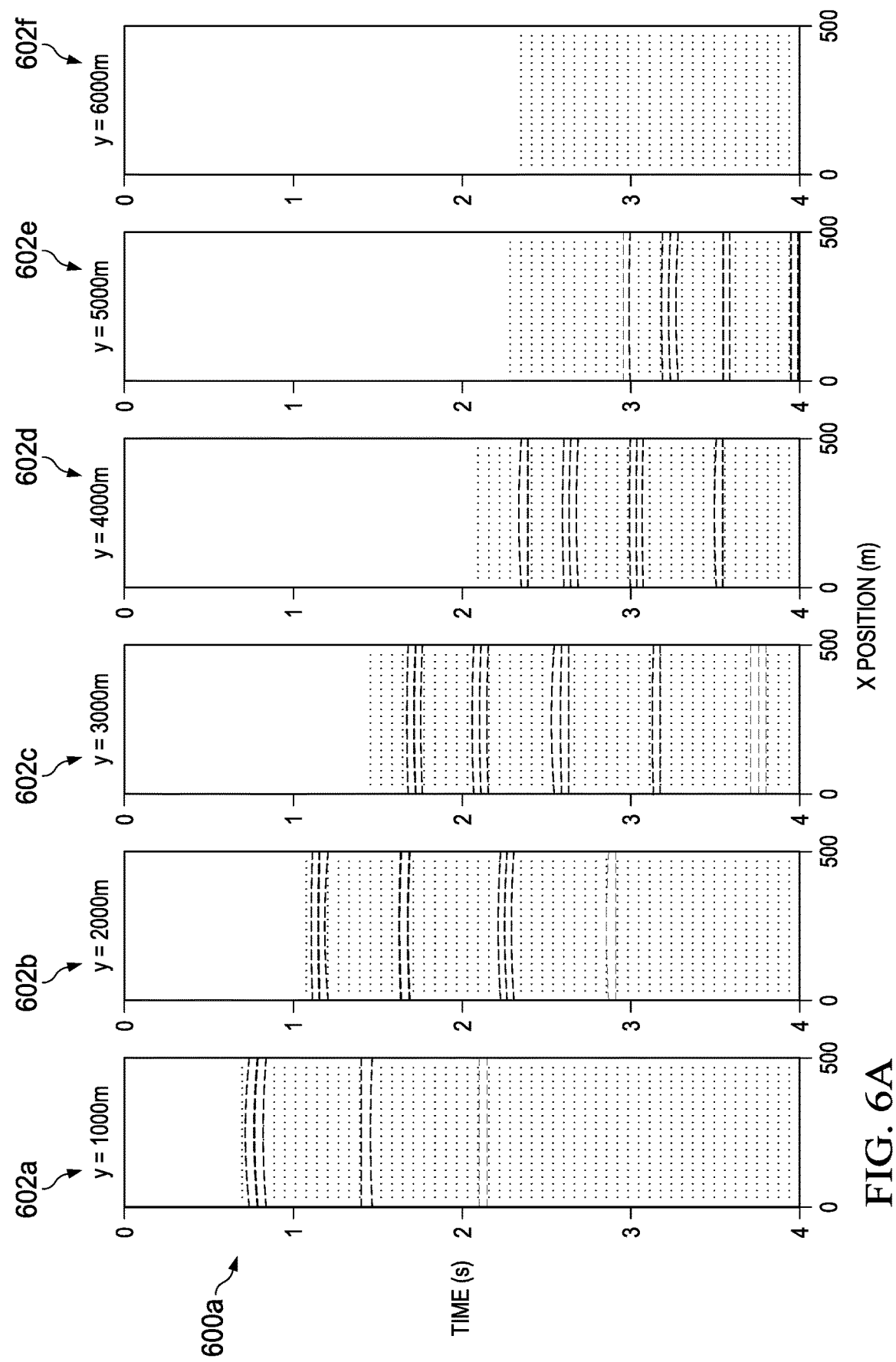
FIGS. 6A/6B and 10A/10B are plots illustrating different crossline sections before and after deghosting and reconstruction manipulation in the horizontal streamer situation and in the quasi-slanted streamer situation, respectively, according to an implementation.

FIGS. 6A/6B and 10A/10B are plots (600a/600b and 1000a/1000b, respectively) illustrating different crossline sections before and after deghosting and reconstruction manipulation in the horizontal streamer situation and in the quasi-slanted streamer situation, respectively, according to an implementation.

Figure 6B:
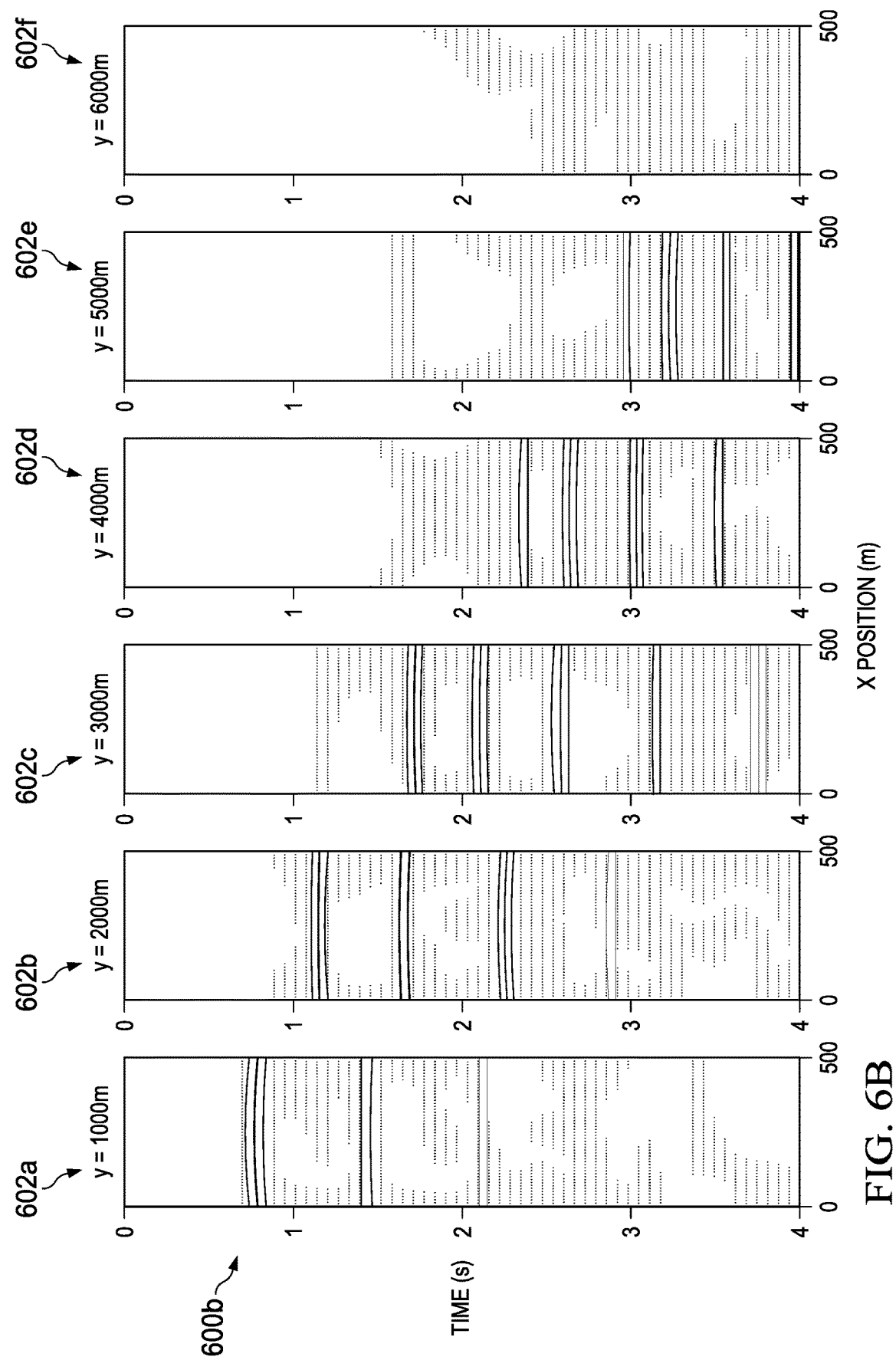

As illustrated, FIG. 6A illustrates 500 m crossline sections 602a-602f (at 1 km inline increments and 4 s time duration) of a ghosted wavefield in the horizontal streamer situation with the previously described, tailored 3D EAGE/SEG overthrust model. FIG. 6B illustrates corresponding crossline sections of FIG. 6A of the deghosted and reconstructed wavefield in the horizontal streamer situation using the described receiver deghosting method.

Figure 10A:
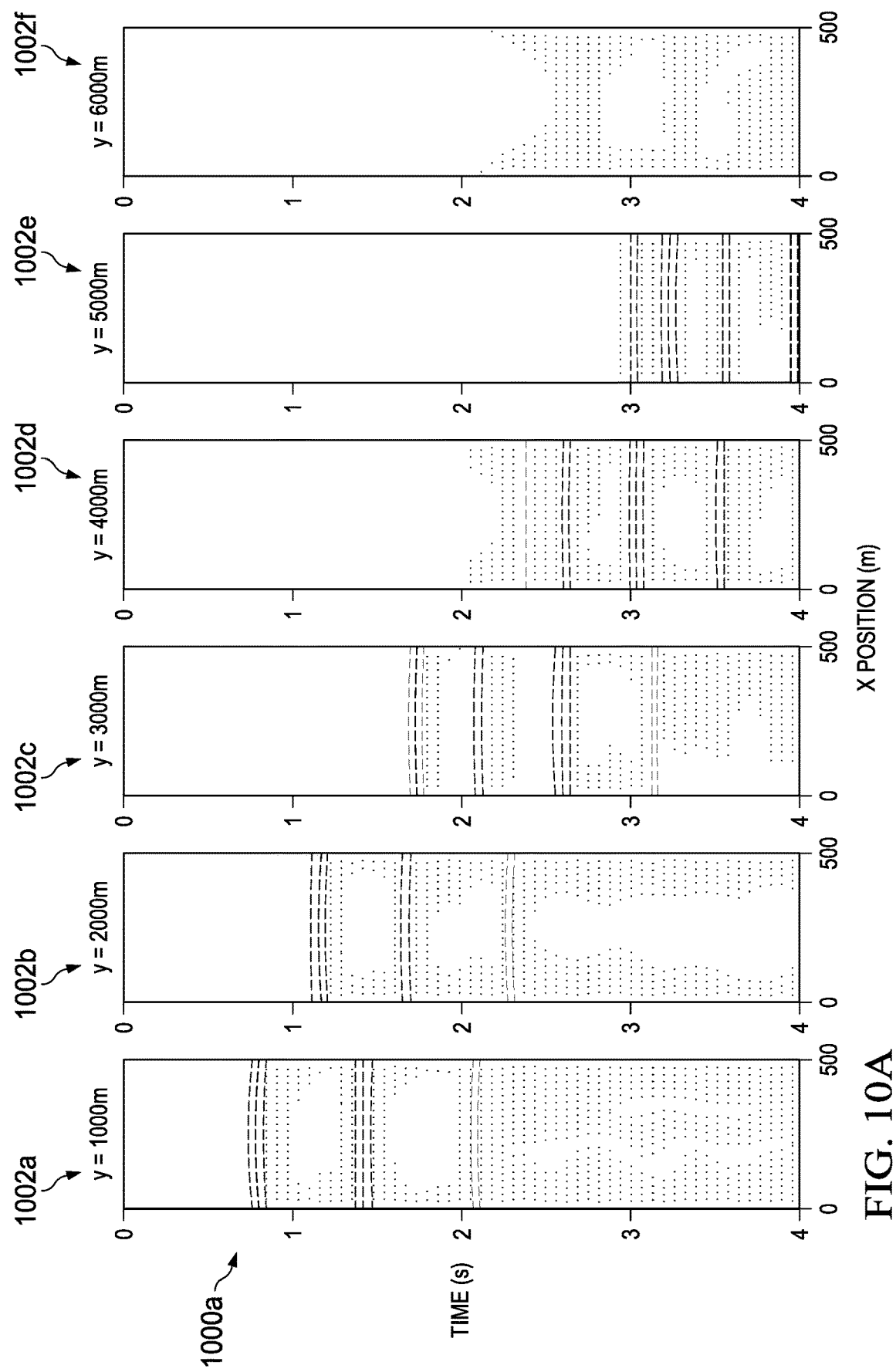
Figure 10B:
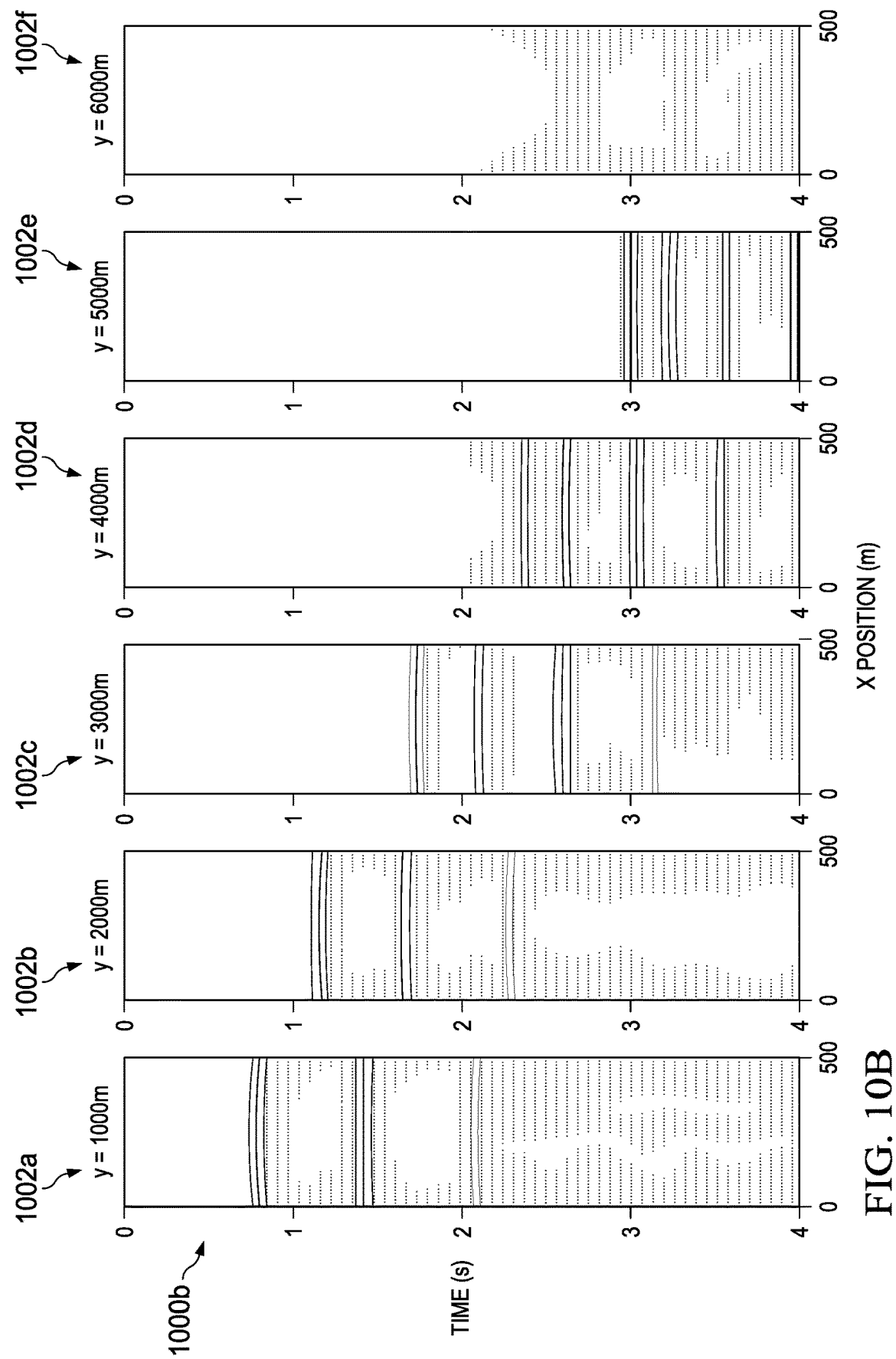

Similar to FIG. 6A, FIG. 10A illustrates 500 m crossline sections 1002a-1002f (at 1 km inline increments and 4 s time duration) of a ghosted wavefield in the quasi-slanted streamer situation with the previously described, tailored 3D EAGE/SEG overthrust model. Likewise, FIG. 6B, FIG. 10B illustrates corresponding crossline sections of FIG. 10A of the deghosted and reconstructed wavefield in the quasi-slanted streamer situation using the described receiver deghosting method. Wavefield reconstruction effects can be observed in both FIG. 6B and FIG. 10B as events are continuous in the X direction.

Figure 7A:
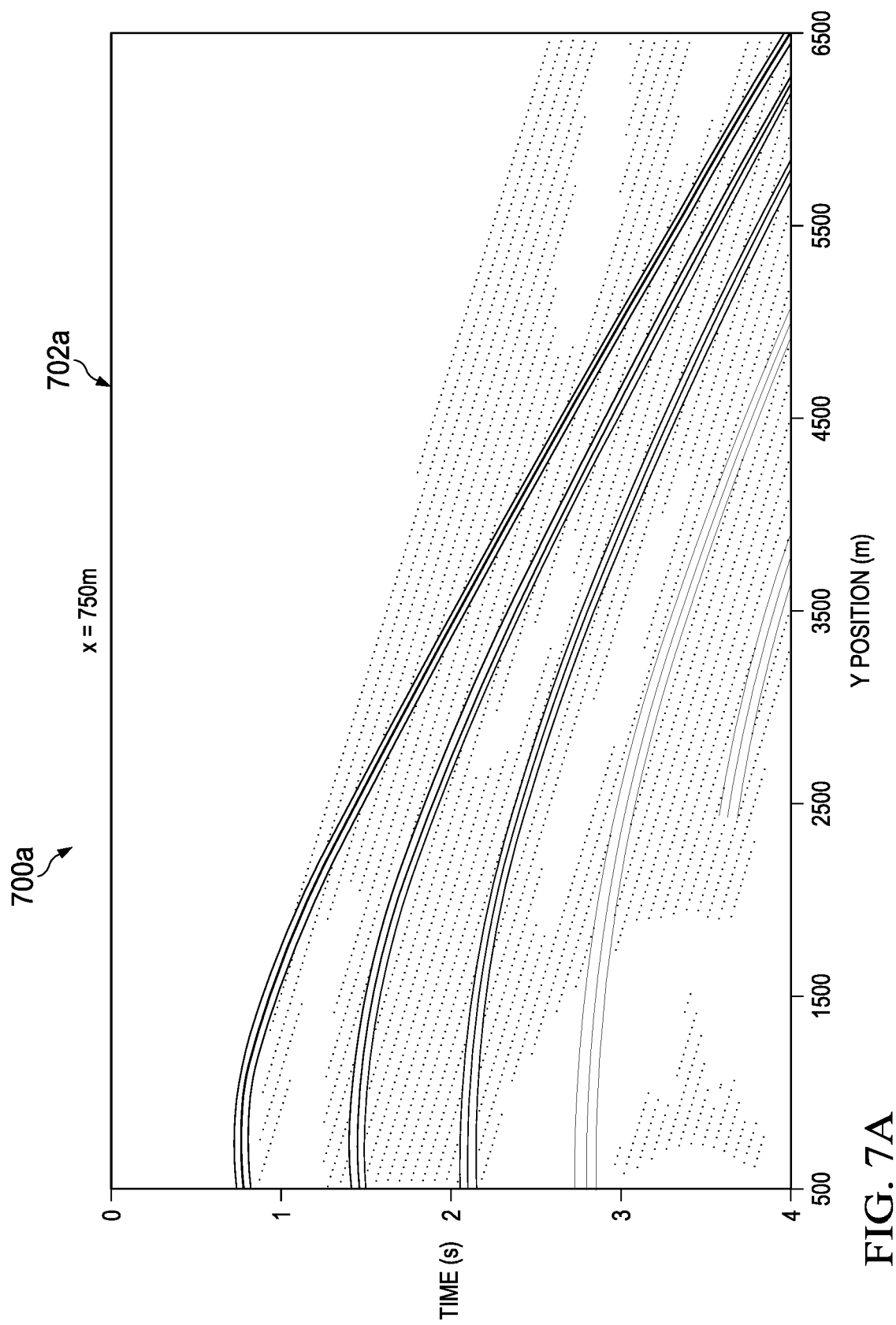
FIGS. 7A/7B, 8A/8B, 11A/11B, and 12A/12B are plots illustrating different inline sections before and after receiver deghosting in both acquisition scenarios, according to an implementation.
Figure 7B:
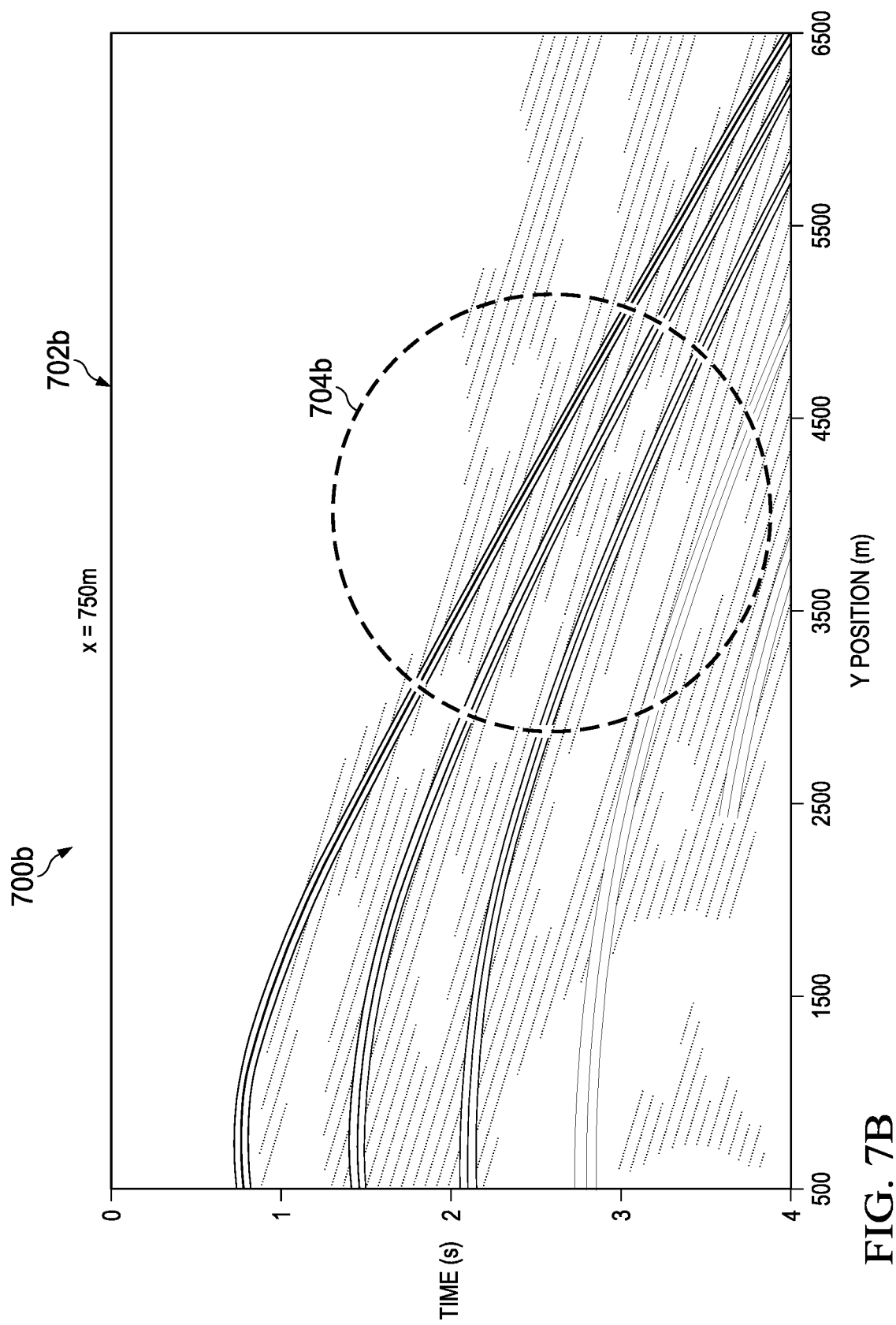

FIGS. 7A/7B, 8A/8B, 11A/11B, and 12A/12B are plots (700a/700b, 800a/800b, 1100a/1100b, and 1200a/1200b, respectively) illustrating different inline sections before and after deghosting in both acquisition scenarios, according to an implementation. FIG. 7A illustrates a single inline section 702a (x=750m and of 4s time duration) of the ghosted wavefield in the horizontal streamer situation with the previously described, tailored 3D EAGE/SEG overthrust model. FIG. 7B illustrates a corresponding deghosted inline section 702b using the described receiver deghosting method, and it can be observed at 704b that receiver ghosting has been removed when compared to the corresponding portion of FIG. 7A.

Figure 8A:
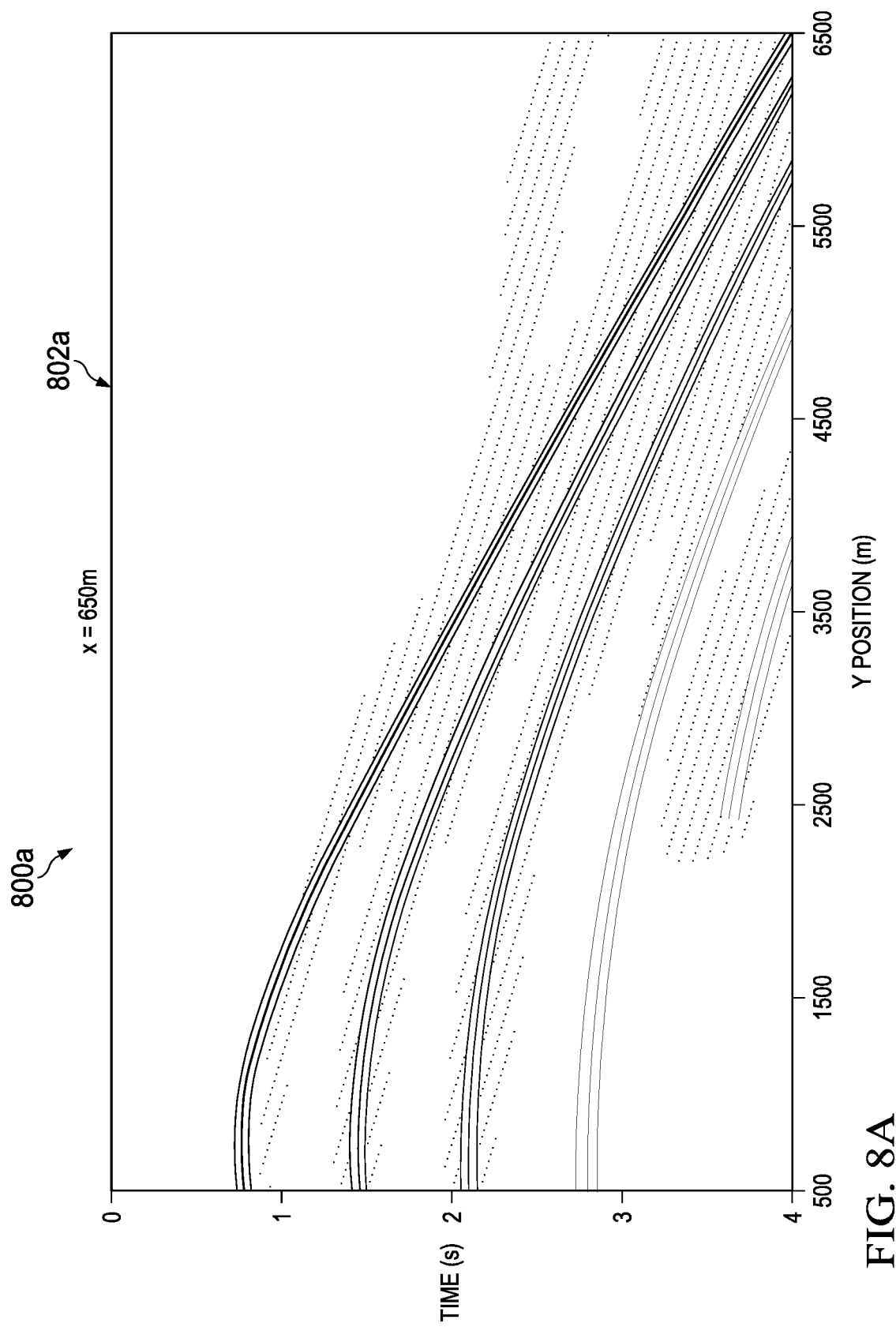
Figure 8B:
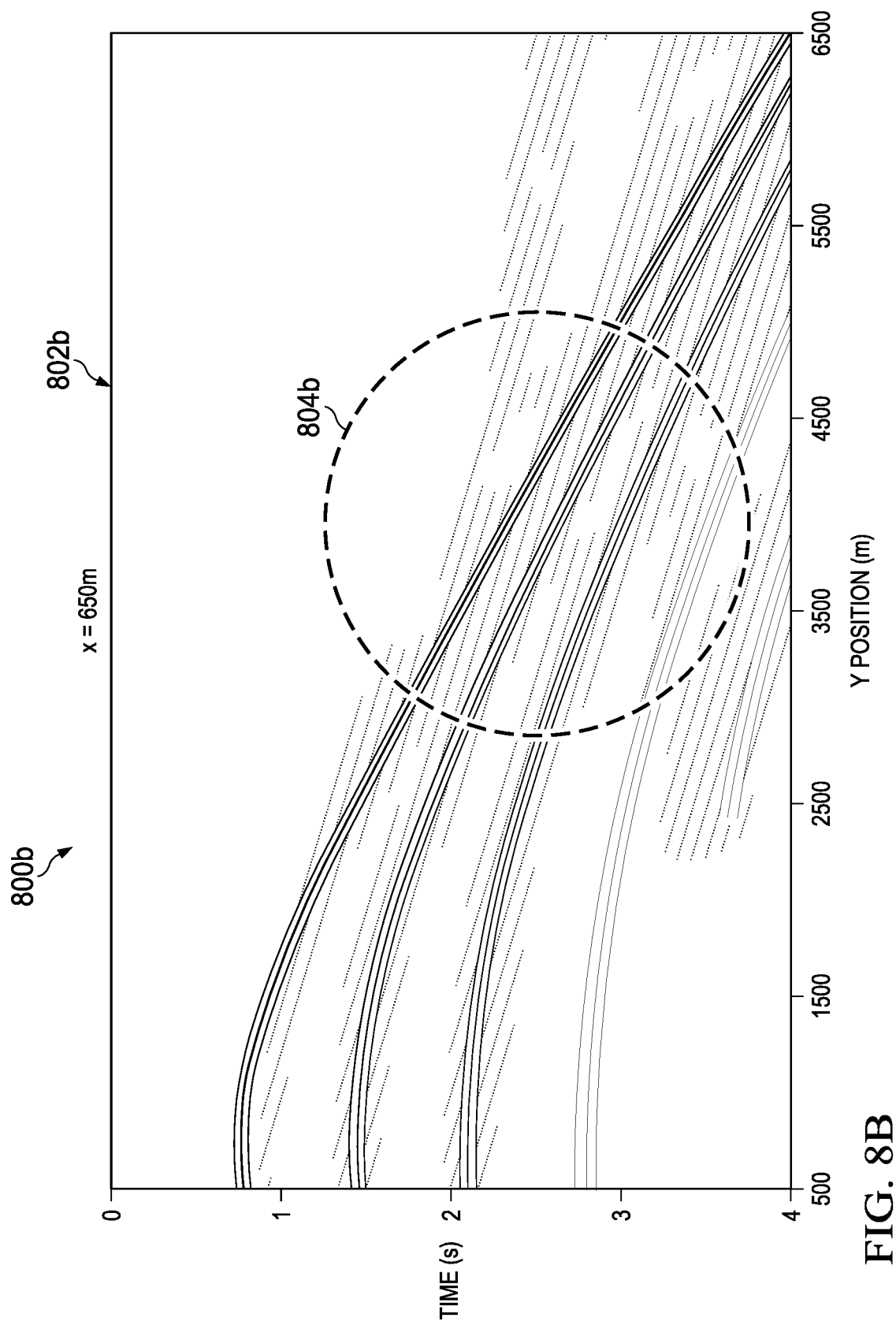

FIG. 8A illustrates a single inline section 802a (x=650m and of 4s time duration) of the ghosted wavefield in the horizontal streamer situation with the previously described, tailored 3D EAGE/SEG overthrust model. FIG. 8B illustrates a corresponding deghosted inline section 802b using the described receiver deghosting method, and it can be observed at 804b that receiver ghosting has been removed when compared to the corresponding portion of FIG. 8A.

Figure 11A:
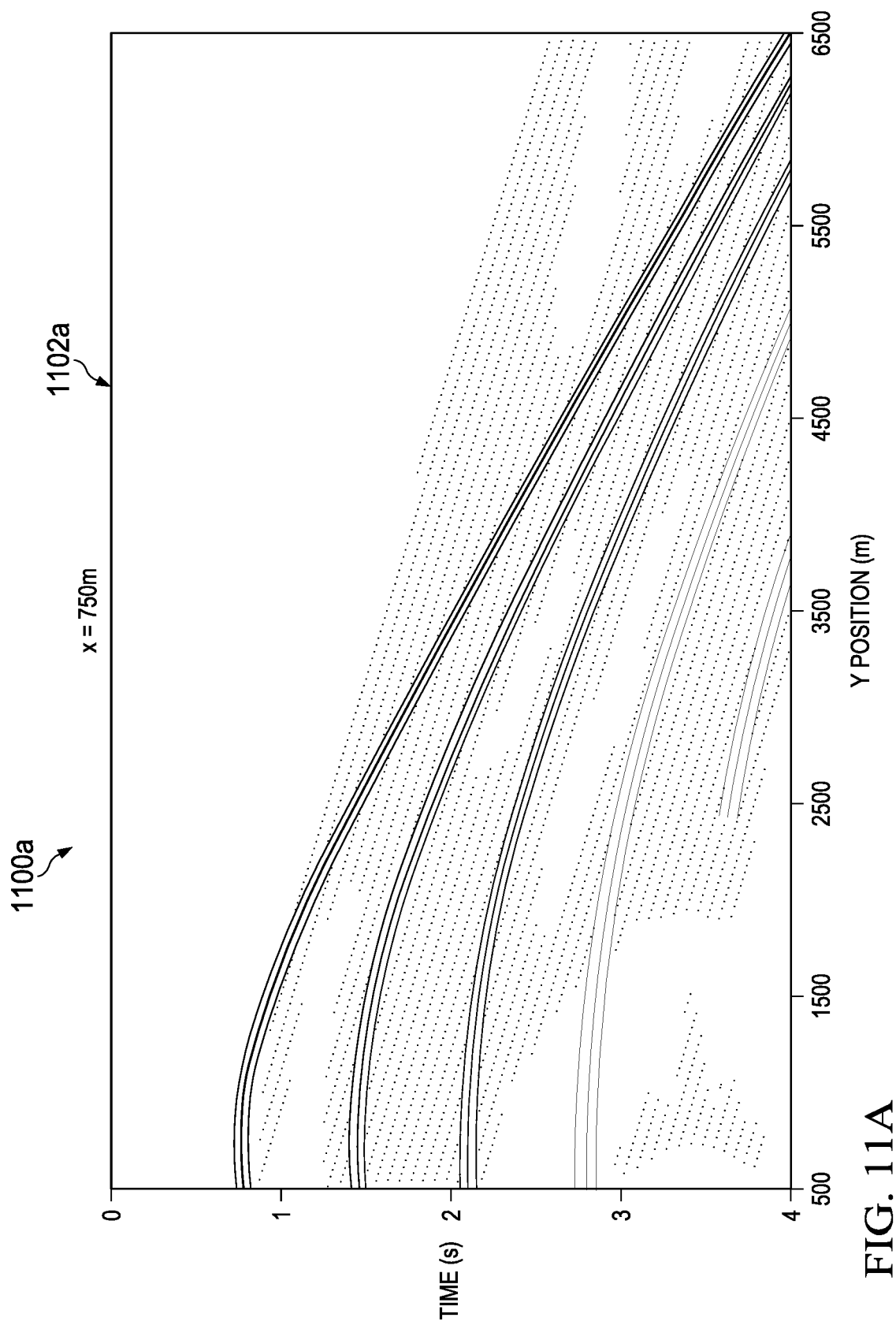
Figure 11B:
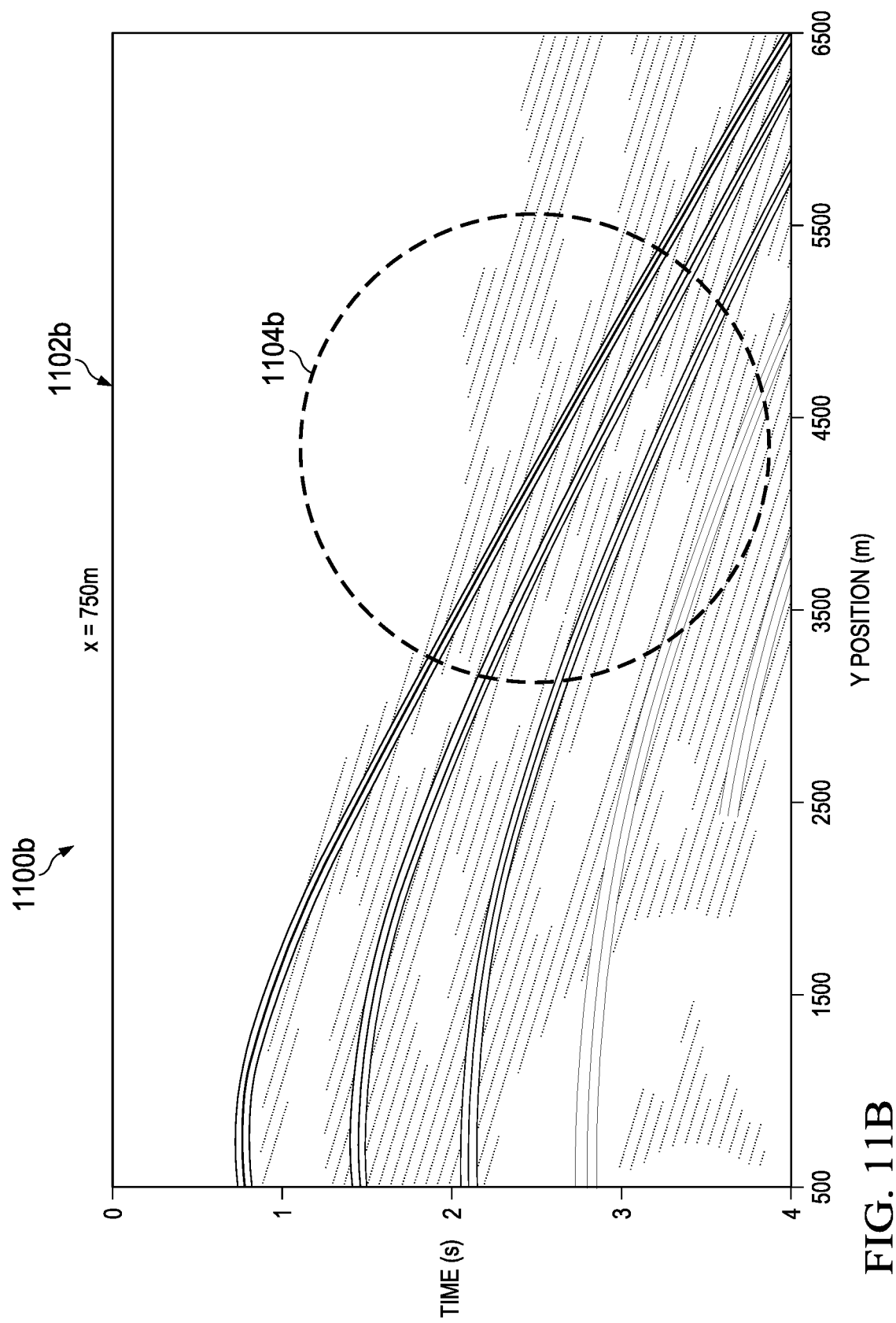

FIG. 11A illustrates a single inline section 1102a (x=750 m and of 4 s time duration) of the ghosted wavefield in the quasi-slanted streamer situation with the previously described, tailored 3D EAGE/SEG overthrust model. FIG. 11B illustrates a corresponding deghosted inline section 1102b using the described receiver deghosting method, and it can be observed at 1104b that receiver ghosting has been removed when compared to the corresponding portion of FIG. 11A.

Figure 12A:
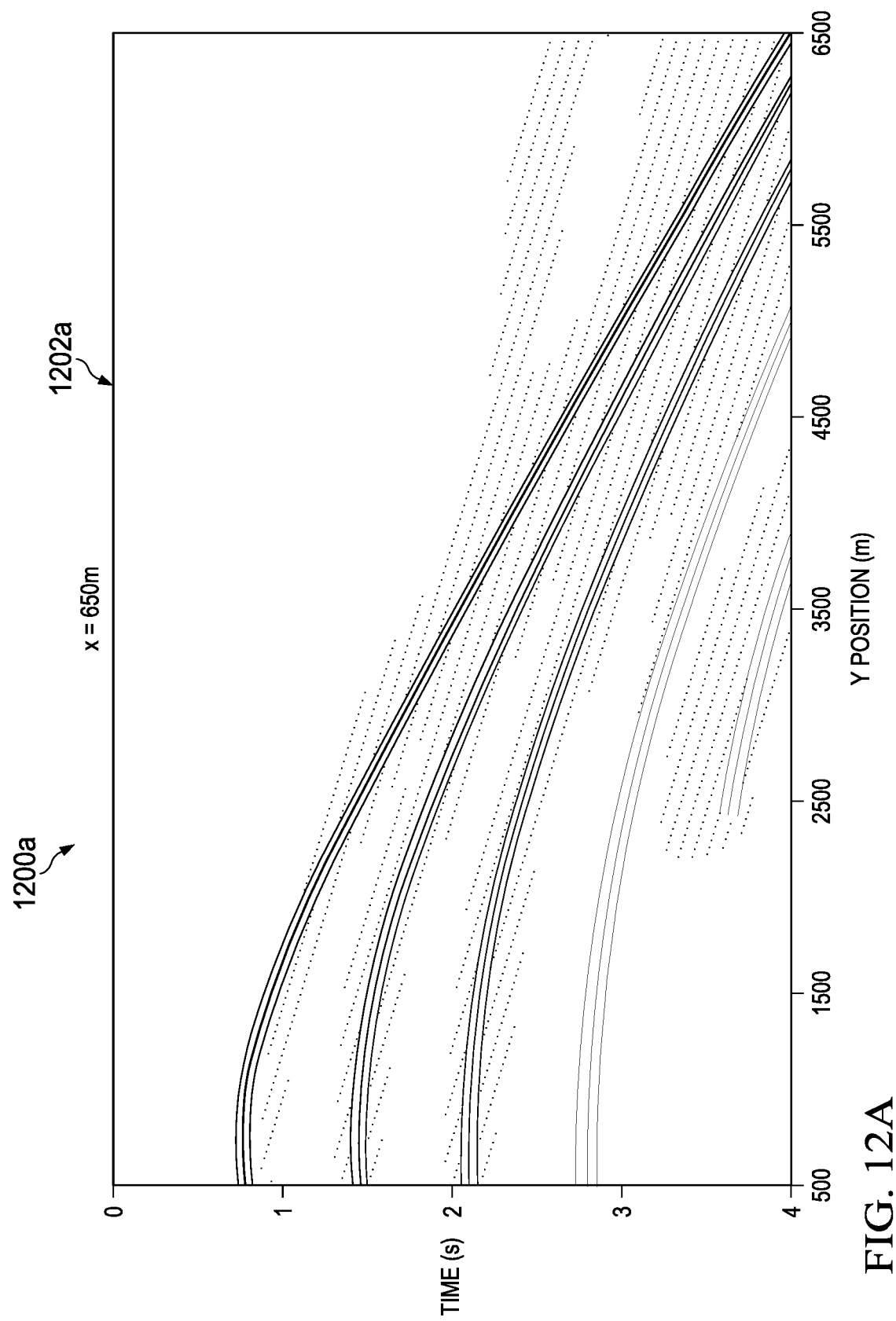
Figure 12B:
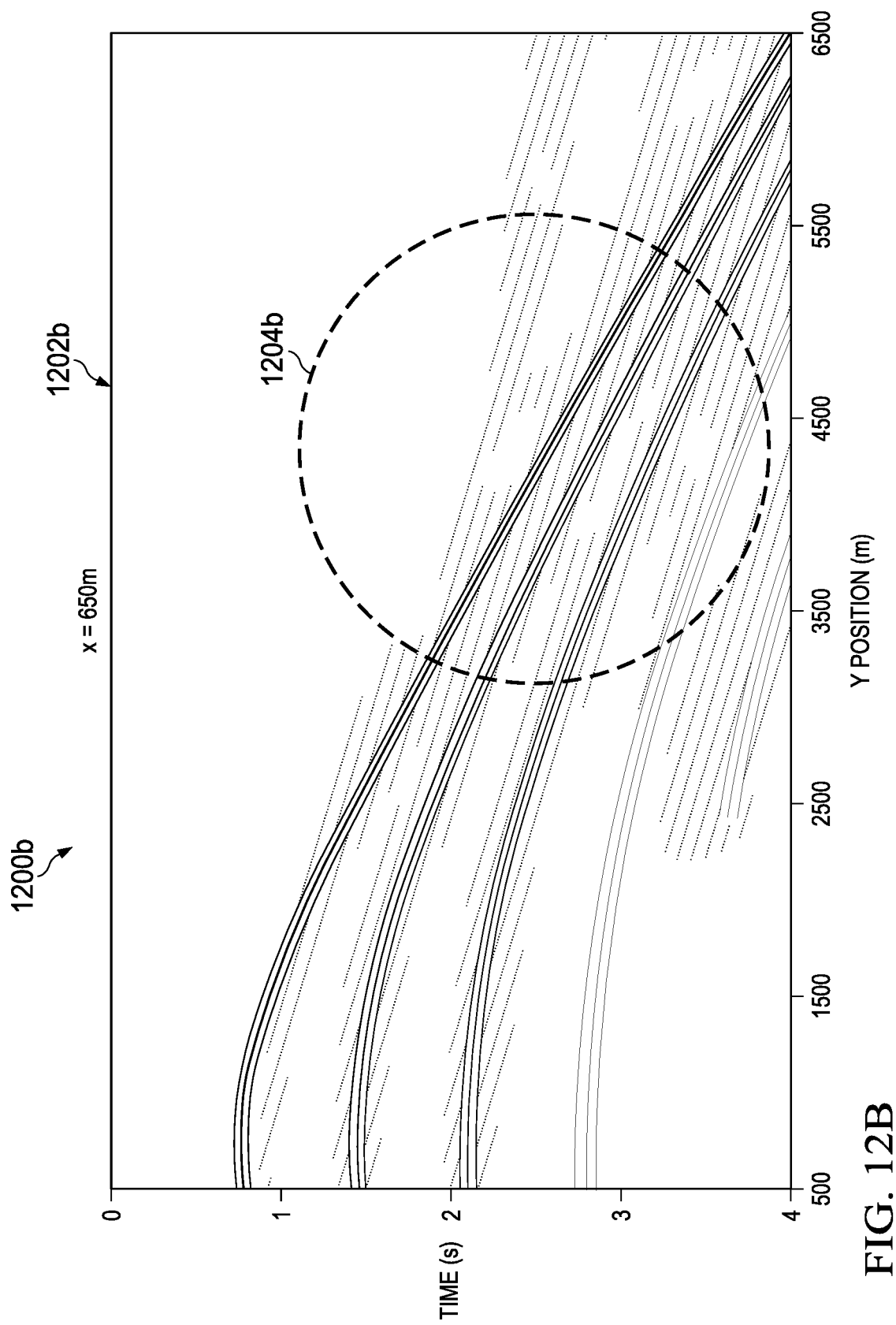

FIG. 12B illustrates a graph 1200b of a corresponding in-situ deghosted inline section, according to an implementation. FIG. 12A illustrates a single inline section 1202a (x=650m and of 4 s time duration) of the ghosted wavefield in the quasi-slanted streamer situation with the previously described, tailored 3D EAGE/SEG overthrust model. FIG. 12B illustrates a corresponding deghosted inline section 1202b using the described receiver deghosting method, and it can be observed at 1204b that receiver ghosting has been removed when compared to the corresponding portion of FIG. 12A.

FIGS. 9A-9C and 13A-13C are plots (900a-900c and 1300a-1300c, respectively) illustrating comparison of seismic traces (amplitude vs. time (s)), both before and after execution, of the described receiver deghosting method, according to an implementation. FIGS. 9A-9C represent the described horizontal streamer case. FIGS. 13A-13C represent the described quasi-slanted streamer case. Amplitude is in Arbitrary Unit (AU) as the data has been normalized. The illustrated results demonstrate the effectiveness of the described receiver deghosting method. While crossline wavefield reconstruction capability is demonstrated in FIGS. 6A-6B and 10A-10B, FIGS. 9A-9C and 13A-13C demonstrate the deghosting effect (indicated by arrows) and that better event recognition is possible (indicated by circles).

FIG. 9A illustrates comparison of seismic traces 902a (ghosted) and 904a (deghosted) in the horizontal streamer situation with the previously described, tailored 3D EAGE/SEG overthrust model and the trace located at x=1050 m and y=750 m. It can be observed that receiver ghosting has been removed in corresponding portions of the deghosted wavefield 904a when compared to the ghosted wavefield 902a.

FIG. 9B illustrates comparison of seismic traces 902b (ghosted) and 904b (deghosted) in the horizontal streamer situation with the previously described, tailored 3D EAGE/SEG overthrust model and the trace located at x=3000 m and y=650 m. It can be observed that receiver ghosting has been removed in corresponding portions of the deghosted wavefield 904b when compared to the ghosted wavefield 902b.

FIG. 9C illustrates comparison of seismic traces 902c (ghosted) and 904c (deghosted) in the horizontal streamer situation with the previously described, tailored 3D EAGE/SEG overthrust model and the trace located at x=5000 m and y=950 m. It can be observed that receiver ghosting has been removed in corresponding portions of the deghosted wavefield 904c when compared to the ghosted wavefield 902c. Also, it can be observed that events 908c and 912c are better defined in the deghosted wavefield 904c when compared to the corresponding events 906c and 910c, respectively, of the ghosted wavefield 902c.

FIG. 13A illustrates comparison of seismic traces 1302a (ghosted) and 1304a (deghosted) in the quasi-slanted streamer situation with the previously described, tailored 3D EAGE/SEG overthrust model and the trace located at x=1050 m and y=750 m. It can be observed that receiver ghosting has been removed in corresponding portions of the deghosted wavefield 1304a when compared to the ghosted wavefield 1302a.

FIG. 13B illustrates comparison of seismic traces 1302b (ghosted) and 1304b (deghosted) in the quasi-slanted streamer situation with the previously described, tailored 3D EAGE/SEG overthrust model and the trace located at x=3000 m and y=650 m. It can be observed that receiver ghosting has been removed in corresponding portions of the deghosted wavefield 1304b when compared to the ghosted wavefield 1302b.

FIG. 13C illustrates comparison of seismic traces 1302c (ghosted) and 1304c (deghosted) in the quasi-slanted streamer situation with the previously described, tailored 3D EAGE/SEG overthrust model and the trace located at x=5000 m and y=950 m. It can be observed that receiver ghosting has been removed in corresponding portions of the deghosted wavefield 1304c when compared to the ghosted wavefield 1302c. Also, it can be observed that events 1308c and 1312c are better defined in the deghosted wavefield 1304c when compared to the corresponding events 1306c and 1310c, respectively, of the ghosted wavefield 1302c.

Figure 14:
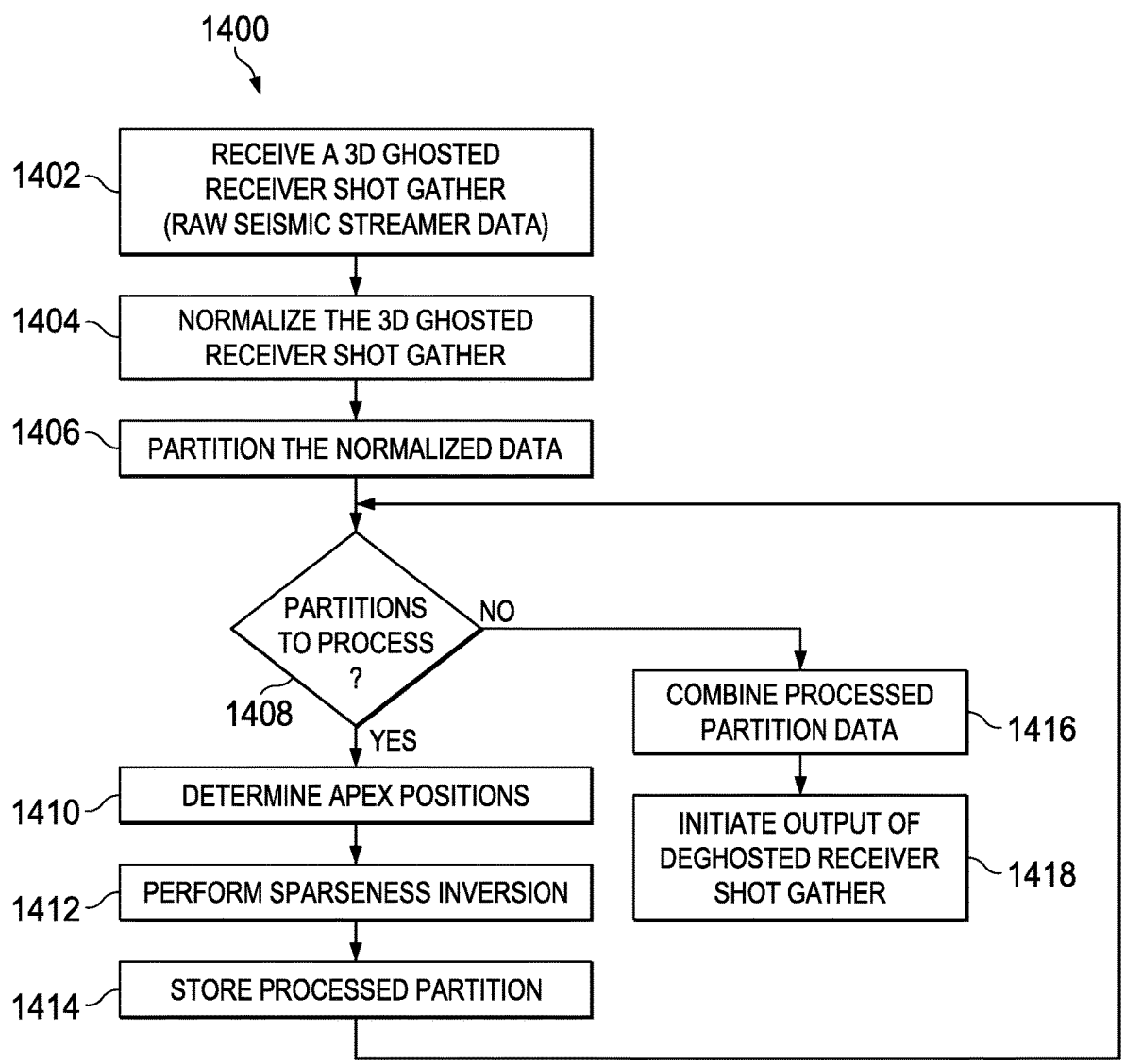
FIG. 14 illustrates a flowchart of an example method for simultaneous wavefield reconstruction and receiver deghosting of seismic streamer data using an L1 inversion, according to an implementation.

FIG. 14 is a flowchart of an example method 1400 for simultaneous wavefield reconstruction and receiver deghosting of seismic streamer data using an L1 inversion, according to an implementation. For clarity of presentation, the description that follows generally describes methods 1400 in the context of the other FIGS. in this description. However, it will be understood that method 1400 may be performed, for example, by any suitable system, environment, software, and hardware, or a combination of systems, environments, software, and hardware as appropriate. In some implementations, various steps of method 1400 can be run in parallel, in combination, in loops, or in any order.

At 1402, 3D ghosted raw seismic streamer wavefield data is received (for example, using push, pull, or both push and pull operations). In typical implementations, the raw seismic streamer wavefield data is a receiver-ghosted shot gather. From 1402, method 1400 proceeds to 1404.

At 1404, the received 3D receiver-ghosted shot gather is normalized and regularized. For example, if the raw data is structured in an irregular grid, each trace can be binned to a user-defined dense regular grid for further processing. Normalization operations can be based on any criteria consistent with this disclosure (for example, amplitude normalization by the total energy of the shot gather). From 1404, method 1400 proceeds to 1406.

At 1406, the regularized data is partitioned for processing. For example, the normalized data can be partitioned into a plurality of user-defined, overlapping sub-gathers based on time, geographic location, or other criteria. The partition method can be influenced by signal-to-noise ratio in the regularized data, but typically, the complete crossline range as a whole is used in the user-defined partition scheme. From 1406, method 1400 proceeds to 1408.

At 1408, a determination is made whether there are remaining partitions to process. If there are no remaining partitions to process, method 1400 proceeds back to 1416. If there are remaining partitions to process, method 1400 proceeds to process a remaining partition using the described simultaneous wavefield reconstruction and receiver deghosting method. From 1408, method 1400 proceeds to 1410.

At 1410, apex positions are determined for the current partition to decide where the apexes, $\xi_{i_p}$, of different Radon curves should be using Equation (6). From 1410, method 1400 proceeds to 1412.

At 1412, a sparseness inversion is performed on the current partition using Equation (2). From 1412, method 1400 proceeds to 1414.

At 1414, the processed partition is stored for output. For example, the processed partition can be stored in RAM memory or a database. From 1414, method 1400 proceeds back to 1408 to determine whether there are remaining partitions to process.

At 1416, the processed partition data is recovered from storage and combined to form a receiver-deghosted shot gather. For example, in an implementation, the processed partition data can be mathematically averaged with a user-defined weight function (for example, a trapezoidal weight function) and combined to form the complete receiver-deghosted shot gather. From 1416, method 1400 proceeds to 1418.

At 1418, output of the receiver-deghosted shot gather is initiated. For example, the receiver-deghosted shot gather can be output as a data set for storage in a computer data store or displayed on a graphical user interface. After 1418, method 1400 stops.

Figure 15:
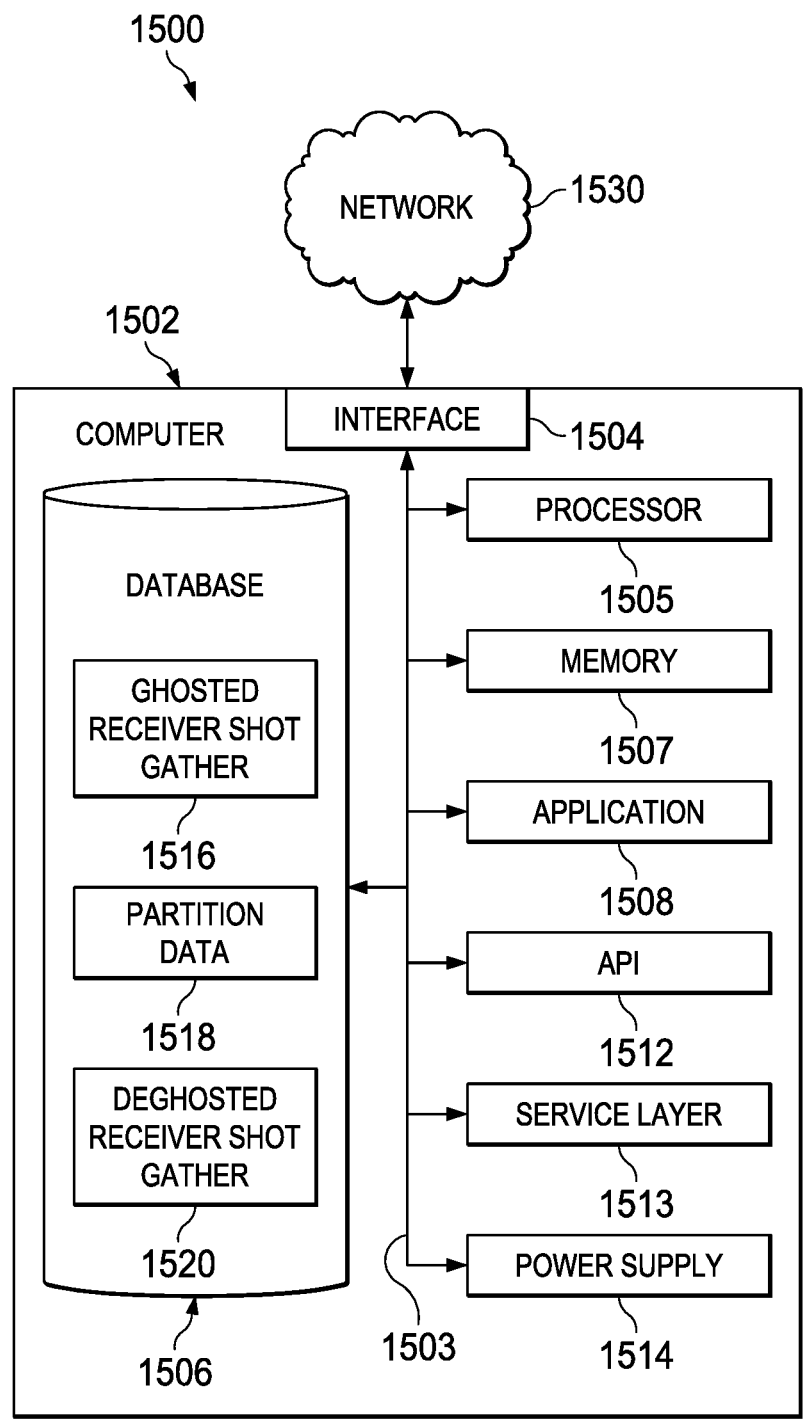
FIG. 15 is a block diagram of an example computer system 1500 used to provide computational functionalities associated with described algorithms, methods, functions, processes, flows, and procedures, as described in the instant disclosure, according to an implementation.

FIG. 15 is a block diagram of an example computer system 1500 used to provide computational functionalities associated with described algorithms, methods, functions, processes, flows, and procedures, as described in the instant disclosure, according to an implementation. The illustrated computer 1502 is intended to encompass any computing device such as a server, desktop computer, laptop/notebook computer, wireless data port, smart phone, personal data assistant (PDA), tablet computing device, one or more processors within these devices, or any other suitable processing device, including physical or virtual instances (or both) of the computing device. Additionally, the computer 1502 may comprise a computer that includes an input device, such as a keypad, keyboard, touch screen, or other device that can accept user information, and an output device that conveys information associated with the operation of the computer 1502, including digital data, visual, or audio information (or a combination of information), or a graphical user interface (GUI).

The computer 1502 can serve in a role as a client, network component, a server, a database or other persistency, or any other component (or a combination of roles) of a computer system for performing the subject matter described in the instant disclosure. The illustrated computer 1502 is communicably coupled with a network 1530. In some implementations, one or more components of the computer 1502 may be configured to operate within environments, including cloud-computing-based, local, global, or other environment (or a combination of environments).

At a high level, the computer 1502 is an electronic computing device operable to receive, transmit, process, store, or manage data and information associated with the described subject matter. According to some implementations, the computer 1502 may also include or be communicably coupled with an application server, e-mail server, web server, caching server, streaming data server, or other server (or a combination of servers).

The computer 1502 can receive requests over network 1530 from a client application (for example, executing on another computer 1502) and respond to the received requests by processing the received requests using an appropriate software application(s). In addition, requests may also be sent to the computer 1502 from internal users (for example, from a command console or by other appropriate access method), external or third-parties, other automated applications, as well as any other appropriate entities, individuals, systems, or computers.

Each of the components of the computer 1502 can communicate using a system bus 1503. In some implementations, any or all of the components of the computer 1502, hardware or software (or a combination of both hardware and software), may interface with each other or the interface 1504 (or a combination of both), over the system bus 1503 using an application programming interface (API) 1512 or a service layer 1513 (or a combination of the API 1512 and service layer 1513). The API 1512 may include specifications for routines, data structures, and object classes. The API 1512 may be either computer-language independent or dependent and refer to a complete interface, a single function, or even a set of APIs. The service layer 1513 provides software services to the computer 1502 or other components (whether or not illustrated) that are communicably coupled to the computer 1502. The functionality of the computer 1502 may be accessible for all service consumers using this service layer. Software services, such as those provided by the service layer 1513, provide reusable, defined functionalities through a defined interface. For example, the interface may be software written in JAVA, C++, or other suitable language providing data in extensible markup language (XML) format or other suitable format. While illustrated as an integrated component of the computer 1502, alternative implementations may illustrate the API 1512 or the service layer 1513 as stand-alone components in relation to other components of the computer 1502 or other components (whether or not illustrated) that are communicably coupled to the computer 1502. Moreover, any or all parts of the API 1512 or the service layer 1513 may be implemented as child or sub-modules of another software module, enterprise application, or hardware module without departing from the scope of this disclosure.

The computer 1502 includes an interface 1504. Although illustrated as a single interface 1504 in FIG. 15, two or more interfaces 1504 may be used according to particular needs, desires, or particular implementations of the computer 1502. The interface 1504 is used by the computer 1502 for communicating with other systems that are connected to the network 1530 (whether illustrated or not) in a distributed environment. Generally, the interface 1504 comprises logic encoded in software or hardware (or a combination of software and hardware) and is operable to communicate with the network 1530. More specifically, the interface 1504 may comprise software supporting one or more communication protocols associated with communications such that the network 1530 or interface's hardware is operable to communicate physical signals within and outside of the illustrated computer 1502.

The computer 1502 includes a processor 1505. Although illustrated as a single processor 1505 in FIG. 15, two or more processors may be used according to particular needs, desires, or particular implementations of the computer 1502. Generally, the processor 1505 executes instructions and manipulates data to perform the operations of the computer 1502 and any algorithms, methods, functions, processes, flows, and procedures as described in the instant disclosure.

The computer 1502 also includes a database 1506 that can hold data for the computer 1502 or other components (or a combination of both) that can be connected to the network 1530 (whether illustrated or not). For example, database 1506 can be an in-memory, conventional, or other type of database storing data consistent with this disclosure. In some implementations, database 1506 can be a combination of two or more different database types (for example, a hybrid in-memory and conventional database) according to particular needs, desires, or particular implementations of the computer 1502 and the described functionality. Although illustrated as a single database 1506 in FIG. 15, two or more databases (of the same or combination of types) can be used according to particular needs, desires, or particular implementations of the computer 1502 and the described functionality. While database 1506 is illustrated as an integral component of the computer 1502, in alternative implementations, database 1506 can be external to the computer 1502. As illustrated, the database 1506 holds the previously described received receiver-ghosted shot gather 1516, partition data 1518, and receiver-deghosted shot gather 1520.

The computer 1502 also includes a memory 1507 that can hold data for the computer 1502 or other components (or a combination of both) that can be connected to the network 1530 (whether illustrated or not). For example, memory 1507 can be random access memory (RAM), read-only memory (ROM), optical, magnetic, and the like, storing data consistent with this disclosure. In some implementations, memory 1507 can be a combination of two or more different types of memory (for example, a combination of RAM and magnetic storage) according to particular needs, desires, or particular implementations of the computer 1502 and the described functionality. Although illustrated as a single memory 1507 in FIG. 15, two or more memories 1507 (of the same or combination of types) can be used according to particular needs, desires, or particular implementations of the computer 1502 and the described functionality. While memory 1507 is illustrated as an integral component of the computer 1502, in alternative implementations, memory 1507 can be external to the computer 1502.

The application 1508 is an algorithmic software engine providing functionality according to particular needs, desires, or particular implementations of the computer 1502, particularly with respect to functionality described in this disclosure. For example, application 1508 can serve as one or more components, modules, or applications. Further, although illustrated as a single application 1508, the application 1508 may be implemented as multiple applications 1508 on the computer 1502. In addition, although illustrated as integral to the computer 1502, in alternative implementations, the application 1508 can be external to the computer 1502.

The computer 1502 can also include a power supply 1514. The power supply 1514 can include a rechargeable or non-rechargeable battery that can be configured to be either user- or non-user-replaceable. In some implementations, the power supply 1514 can include power-conversion or management circuits (including recharging, standby, or other power management functionality). In some implementations, the power-supply 1514 can include a power plug to allow the computer 1502 to be plugged into a wall socket or other power source to, for example, power the computer 1502 or recharge a rechargeable battery.

There may be any number of computers 1502 associated with, or external to, a computer system containing computer 1502, each computer 1502 communicating over network 1530. Further, the term "client," "user," and other appropriate terminology may be used interchangeably, as appropriate, without departing from the scope of this disclosure. Moreover, this disclosure contemplates that many users may use one computer 1502, or that one user may use multiple computers 1502.

Described implementations of the subject matter can include one or more features, alone or in combination.

For example, in a first implementation, a computer-implemented method, comprising: receiving raw 3D seismic streamer wavefield data as a receiver-ghosted shot gather; processing the received receiver-ghosted shot gather into a normalized form as normalized data; partitioning the normalized data into a plurality of user-defined sub-gathers; processing, by a computer, each of the plurality of user-defined sub-gathers to generate a complete receiver-deghosted shot gather; and initiating output of the complete receiver-deghosted shot gather.

The foregoing and other described implementations can each, optionally, include one or more of the following features:

A first feature, combinable with any of the following features, further comprising binning the normalized data into a user-defined, dense, regular grid if the receiver-ghosted shot gather is in an irregular grid.

A second feature, combinable with any of the previous or following features, further comprising determining apex positions of Radon curves associated with a particular user-defined sub-gather.

A third feature, combinable with any of the previous or following features, wherein the determination of the apex positions uses a Redundant, Hybrid, Apex-Shifted Radon Dictionary such that a function of variable $\xi$ is expressed as:

$$f(\xi) = \tau + p\xi + \Sigma_{n=2}^{\infty} \Sigma_{i_n = A_n}^{B_n} q_{i_n}(\xi - \xi_{i_n})^n.$$

A fourth feature, combinable with any of the previous or following features, wherein $\xi_{i_n}$ is manually introduced as an additional apex shift, $q_{i_n}$ is a corresponding representation, and $A_n$ and $B_n$ are control parameters.

A fifth feature, combinable with any of the previous or following features, further comprising performing a sparseness inversion using the determined apex positions and solving for:

$$\min_x \|Ax - b\|_2 \text{ s.t. } \|x\|_1 < t.$$

A sixth feature, combinable with any of the previous or following features, further comprising combining the processed partition data corresponding to each of the plurality of user-defined, sub-gathers to generate the receiver-deghosted shot gather.

In a second implementation, a non-transitory, computer-readable medium storing one or more instructions executable by a computer system to perform operations comprising: receiving raw 3D seismic streamer wavefield data as a receiver-ghosted shot gather; processing the received receiver-ghosted shot gather into a normalized form as normalized data; partitioning the normalized data into a plurality of user-defined sub-gathers; processing each of the plurality of user-defined sub-gathers to generate a complete receiver-deghosted shot gather; and initiating output of the complete receiver-deghosted shot gather.

The foregoing and other described implementations can each, optionally, include one or more of the following features:

A first feature, combinable with any of the following features, further comprising binning the normalized data into a user-defined, dense, regular grid if the receiver-ghosted shot gather is in an irregular grid.

A second feature, combinable with any of the previous or following features, further comprising one or more instructions to determine apex positions of Radon curves associated with a particular user-defined, sub-gather.

A third feature, combinable with any of the previous or following features, wherein the determination of the apex positions uses a Redundant, Hybrid, Apex-Shifted Radon Dictionary such that a function of variable $\xi$ is expressed as:

$$f(\xi)=\tau+p\xi+\Sigma_{n=2}^{\infty}\Sigma_{i_n=A_n}^{B_n}q_{i_n}(\xi-\xi_{i_n})^n.$$

A fourth feature, combinable with any of the previous or following features, wherein $\xi_{i_n}$ is manually introduced as an additional apex shift, $q_{i_n}$ is a corresponding representation, and $A_n$ and $B_n$ are control parameters.

A fifth feature, combinable with any of the previous or following features, further comprising one or more instructions to perform a sparseness inversion using the determined apex positions and solving for:

$$\min_x \|Ax-b\|_2 \text{ s.t. } \|x\|_1 < t.$$

A sixth feature, combinable with any of the previous or following features, further comprising one or more instructions to combine the processed partition data corresponding to each of the plurality of user-defined sub-gathers to generate the receiver-deghosted shot gather.

In a third implementation, a computer system, comprising: a computer memory; and a hardware processor interoperably coupled with the computer memory and configured to perform operations comprising: receiving raw 3D seismic streamer wavefield data as a receiver-ghosted shot gather; processing the received receiver-ghosted shot gather into a normalized form as normalized data; partitioning the normalized data into a plurality of user-defined sub-gathers; processing each of the plurality of user-defined sub-gathers to generate a complete receiver-deghosted shot gather; and initiating output of the complete receiver-deghosted shot gather.

The foregoing and other described implementations can each, optionally, include one or more of the following features:

A first feature, combinable with any of the following features, further comprising binning the normalized data into a user-defined, dense, regular grid if the receiver-ghosted shot gather is in an irregular grid.

A second feature, combinable with any of the previous or following features, further comprising one or more instructions to determine apex positions of Radon curves associated with a particular user-defined sub-gather.

A third feature, combinable with any of the previous or following features, wherein the determination of the apex positions uses a Redundant, Hybrid, Apex-Shifted Radon Dictionary such that a function of variable $\xi$ is expressed as:

$$f(\xi)=\tau+p\xi+\Sigma_{n=2}^{\infty}\Sigma_{i_n=A_n}^{B_n}q_{i_n}(\xi-\xi_{i_n})^n.$$

A fourth feature, combinable with any of the previous or following features, wherein $\xi_{i_n}$ is manually introduced as an additional apex shift, $q_{i_n}$ is a corresponding representation, and $A_n$ and $B_n$ are control parameters.

A fifth feature, combinable with any of the previous or following features, further comprising one or more instructions to perform a sparseness inversion using the determined apex positions and solving for:

$$\min_x \|Ax-b\|_2 \text{ s.t. } \|x\|_1 < t.$$

A sixth feature, combinable with any of the previous or following features, further configured to combine the processed partition data corresponding to each of the plurality of user-defined sub-gathers to generate the receiver-deghosted shot gather.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data may be less than 1 ms, less than 1 sec., or less than 5 secs. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or described as a program, software, a software application, a module, a software module, a script, or code can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM), or both. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data includes all forms of non-volatile memory, media and memory devices, including by way of example semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD+/–R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain this disclosure. Other changes, substitutions, and alterations are also possible without departing from the spirit and scope of this disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
    receiving raw three-dimensional (3D) seismic streamer wavefield data as a receiver-ghosted shot gather;
    processing the received receiver-ghosted shot gather into a normalized form as normalized data;
    partitioning the normalized data into a plurality of user-defined sub-gathers;
    determining apex positions of Radon curves associated with each of the plurality user-defined sub-gathers, wherein the determination of the apex positions uses a Redundant, Hybrid, Apex-Shifted Radon Dictionary such that a function of variable $\xi$ is expressed as: $f(\xi)=\tau+p\xi+\Sigma_{n=2}^{\infty}\Sigma_{i_n=A_n}^{B_n}q_{i_n}(\xi-\xi_{i_n})^n$, wherein p is a ray parameter and $\tau$ is a time shift at $\xi=0$, and wherein $\xi_{i_n}$ is introduced as an additional apex shift, $q_{i_n}$ is a corresponding representation, and $A_n$ and $B_n$ are control parameters;
    processing, by a computer, each of the plurality of user-defined sub-gathers to generate a complete receiver-deghosted shot gather, wherein computational artifacts are suppressed in the complete receiver-deghosted shot gather; and
    initiating output of the complete receiver-deghosted shot gather.

2. The computer-implemented method of claim 1, further comprising binning the normalized data into a user-defined, dense, regular grid if the receiver-ghosted shot gather is in an irregular grid.

3. The computer-implemented method of claim 1, further comprising combining the processed partition data corresponding to each of the plurality of user-defined, sub-gathers to generate the receiver-deghosted shot gather.

4. A non-transitory, computer-readable medium storing one or more instructions executable by a computer system to perform operations comprising:
    receiving raw three-dimensional (3D) seismic streamer wavefield data as a receiver-ghosted shot gather;
    processing the received receiver-ghosted shot gather into a normalized form as normalized data;
    partitioning the normalized data into a plurality of user-defined sub-gathers;
    determining apex positions of Radon curves associated with each of the plurality user-defined sub-gathers, wherein the determination of the apex positions uses a Redundant, Hybrid, Apex-Shifted Radon Dictionary such that a function of variable $\xi$ is expressed as: $f(\xi)=\tau+p\xi+\Sigma_{n=2}^{\infty}\Sigma_{i_n=A_n}^{B_n}q_{i_n}(\xi-\xi_{i_n})^n$, wherein p is a ray parameter and $\tau$ is a time shift at $\xi=0$ and wherein $\xi_{i_n}$ is introduced as an additional apex shift, $q_{i_n}$ is a corresponding representation, and $A_n$ and $B_n$ are control parameters;

processing each of the plurality of user-defined sub-gathers to generate a complete receiver-deghosted shot gather, wherein computational artifacts are suppressed in the complete receiver-deghosted shot gather; and initiating output of the complete receiver-deghosted shot gather.

5. The non-transitory, computer-readable medium of claim 4, further comprising binning the normalized data into a user-defined, dense, regular grid if the receiver-ghosted shot gather is in an irregular grid.

6. The non-transitory, computer-readable medium of claim 4, further comprising one or more instructions to combine the processed partition data corresponding to each of the plurality of user-defined sub-gathers to generate the receiver-deghosted shot gather.

7. A computer system, comprising:

a computer memory; and a hardware processor interoperably coupled with the computer memory and configured to perform operations comprising:

receiving raw three-dimensional (3D) seismic streamer wavefield data as a receiver-ghosted shot gather;

processing the received receiver-ghosted shot gather into a normalized form as normalized data;

partitioning the normalized data into a plurality of user-defined sub-gathers;

determining apex positions of Radon curves associated with each of the plurality user-defined sub-gathers, wherein the determination of the apex positions uses a Redundant, Hybrid, Apex-Shifted Radon Dictionary such that a function of variable $\xi$ is expressed as: $f(\xi)=\tau+p\xi+\Sigma_{n=2}^{\infty}\Sigma_{i_n=A_n}^{B_n}q_{i_n}(\xi-\xi_{i_n})^n$, wherein p is a ray parameter and $\tau$ is a time shift at $\xi=0$ and wherein $\xi_{i_n}$ is introduced as an additional apex shift, $q_{i_n}$ is a corresponding representation, and $A_n$ and $B_n$ are control parameters;

processing each of the plurality of user-defined sub-gathers to generate a complete receiver-deghosted shot gather, wherein computational artifacts are suppressed in the complete receiver-deghosted shot gather; and initiating output of the complete receiver-deghosted shot gather.

8. The computer system of claim 7, further comprising binning the normalized data into a user-defined, dense, regular grid if the receiver-ghosted shot gather is in an irregular grid.

9. The computer system of claim 7, further configured to combine the processed partition data corresponding to each of the plurality of user-defined sub-gathers to generate the receiver-deghosted shot gather.

* * * * *